United States Patent
Hasegawa et al.

(10) Patent No.: US 10,356,818 B2
(45) Date of Patent: Jul. 16, 2019

(54) WIRELESS COMMUNICATION TERMINAL, WIRELESS COMMUNICATION SYSTEM, WIRELESS COMMUNICATION METHOD, AND RECORDING MEDIUM

(71) Applicant: OLYMPUS CORPORATION, Hachioji-shi, Tokyo (JP)

(72) Inventors: Yasuhiro Hasegawa, Hanno (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/190,476

(22) Filed: Nov. 14, 2018

(65) Prior Publication Data

US 2019/0082464 A1 Mar. 14, 2019

Related U.S. Application Data

(63) Continuation of application No. PCT/JP2016/065274, filed on May 24, 2016.

(51) Int. Cl.
*H04W 84/18* (2009.01)
*H04W 74/08* (2009.01)
(Continued)

(52) U.S. Cl.
CPC ....... *H04W 74/0808* (2013.01); *H04W 16/14* (2013.01); *H04W 72/02* (2013.01);
(Continued)

(58) Field of Classification Search
CPC ........... H04W 74/0808; H04W 74/002; H04W 16/14; H04W 72/02; H04W 72/082; H04W 84/18; H04W 72/04; H04W 84/12
See application file for complete search history.

(56) References Cited

U.S. PATENT DOCUMENTS

2003/0125067 A1 7/2003 Takeda et al.
2007/0242650 A1 10/2007 Fujiwara
(Continued)

FOREIGN PATENT DOCUMENTS

JP 2003-258719 A 9/2003
JP 2006-25388 A 1/2006
(Continued)

OTHER PUBLICATIONS

International Search Report dated Jun. 28, 2016, issued in counterpart International Application No. PCT/JP2016/065274, with English Translation. (2 pages).
(Continued)

*Primary Examiner* — Chuong A Ngo
(74) *Attorney, Agent, or Firm* — Westerman, Hattori, Daniels & Adrian, LLP

(57) ABSTRACT

A wireless communication terminal has a plurality of communicators, a radar detection circuit, a channel use confirmation circuit, a channel information acquisition circuit, a channel information notification circuit, a channel determination circuit, and a channel setting circuit. First communication channel information indicates a data communication channel set in a communicator of a first peripheral terminal. Second communication channel information indicates a monitoring communication channel set in the communicator of the first peripheral terminal or a communication channel confirmed to be usable by the channel use confirmation circuit of the first peripheral terminal. The channel determination circuit determines a communication channel different from any of a first communication channel indicated by the first communication channel information and a second communication channel indicated by the second communication channel information as the data communication channel.

10 Claims, 18 Drawing Sheets

(51) Int. Cl.
  *H04W 72/04* (2009.01)
  *H04W 84/12* (2009.01)
  *H04W 72/02* (2009.01)
  *H04W 72/08* (2009.01)
  *H04W 16/14* (2009.01)
  *H04W 74/00* (2009.01)

(52) U.S. Cl.
  CPC ......... *H04W 72/04* (2013.01); *H04W 72/082* (2013.01); *H04W 74/002* (2013.01); *H04W 84/12* (2013.01); *H04W 84/18* (2013.01)

(56) References Cited

U.S. PATENT DOCUMENTS

| | | |
|---|---|---|
| 2009/0122775 A1 | 5/2009 | Haartsen |
| 2009/0279463 A1 | 11/2009 | Kuliner et al. |
| 2014/0287790 A1* | 9/2014 | Ichikawa ............... H04W 72/04 455/509 |
| 2016/0014780 A1* | 1/2016 | Horisaki ............... H04W 16/14 370/315 |
| 2018/0027420 A1* | 1/2018 | Takahashi ............... H04W 4/18 370/329 |

FOREIGN PATENT DOCUMENTS

| | | |
|---|---|---|
| JP | 4311262 B2 | 8/2009 |
| JP | 2009-206999 A | 9/2009 |
| JP | 2011-15048 A | 1/2011 |
| JP | 4886814 B2 | 2/2012 |
| JP | 5210404 B2 | 6/2013 |
| JP | 2015-95838 A | 5/2015 |
| WO | 2015/034934 A2 | 3/2015 |

OTHER PUBLICATIONS

International Search Report dated Jun. 13, 2017, issued in counterpart International Application No. PCT/JP2017/018993, with English Translation. (2 pages).

International Search Report dated Jun. 13, 2017, issued in counterpart International Application No. PCT/JP2017/018994, with English Translation. (2 pages).

* cited by examiner

| | RECEIVER 200b (OWN TERMINAL) | RECEIVER 201b | RECEIVER 202b |
|---|---|---|---|
| COMMUNICATOR 231 | 52ch (FOR COMMUNICATION) | 56ch (FOR DFS MONITORING) | 60ch (FOR DFS MONITORING) |
| COMMUNICATOR 232 | 100ch (FOR STANDBY) | 104ch (FOR COMMUNICATION) | 108ch (FOR COMMUNICATION) |
| COMMUNICATOR 236 | 124ch (FOR DFS MONITORING) | 128ch (FOR STANDBY) | 132ch (FOR STANDBY) |

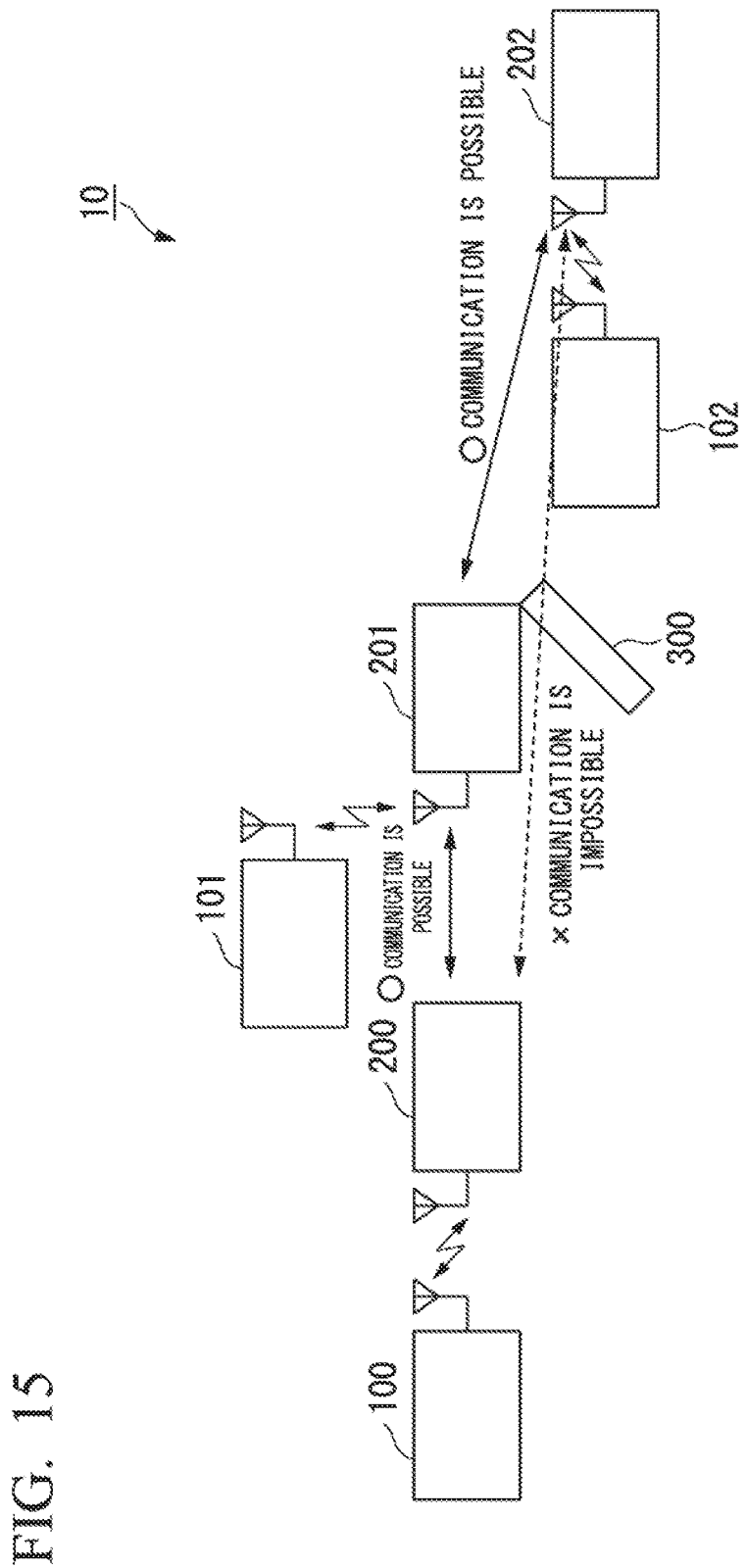

|  | RECEIVER 200 (OWN TERMINAL) | RECEIVER 201 | RECEIVER 202 |
|---|---|---|---|
| COMMUNICATOR 231 | 52ch (FOR COMMUNICATION) | 56ch (FOR DFS MONITORING) | 60ch (FOR DFS MONITORING) |
| COMMUNICATOR 232 | 124ch (FOR DFS MONITORING) | 104ch (FOR COMMUNICATION) | 108ch (FOR COMMUNICATION) |

T201c

|  | RECEIVER 201 | RECEIVER 202 |
|---|---|---|
| COMMUNICATOR 231 | 56ch (FOR DFS MONITORING) | 60ch (FOR DFS MONITORING) |
| COMMUNICATOR 232 | 104ch (FOR COMMUNICATION) | 108ch (FOR COMMUNICATION) |

|  | RECEIVER 200 (OWN TERMINAL) | RECEIVER 201 | RECEIVER 202 |
|---|---|---|---|
| COMMUNICATOR 231 | 52ch (FOR COMMUNICATION) | 56ch (FOR DFS MONITORING) | 60ch (FOR DFS MONITORING) |
| COMMUNICATOR 232 | 124ch (FOR DFS MONITORING) | 104ch (FOR COMMUNICATION) | 108ch (FOR COMMUNICATION) |
| RADAR DETECTION CHANNEL | 116ch 9:00:12 | 112ch 9:10:15 | — |

T201d

|  | RECEIVER 201 |
|---|---|
| COMMUNICATOR 231 | 56ch (FOR DFS MONITORING) |
| COMMUNICATOR 232 | 104ch (FOR COMMUNICATION) |
| RADAR DETECTION CHANNEL | 112ch 9:10:15 |

T202d

|  | RECEIVER 202 |
|---|---|
| COMMUNICATOR 231 | 60ch (FOR DFS MONITORING) |
| COMMUNICATOR 232 | 108ch (FOR COMMUNICATION) |
| RADAR DETECTION CHANNEL | — |

FIG. 22

| | RECEIVER 200 (OWN TERMINAL) | RECEIVER 201 | RECEIVER 202 |
|---|---|---|---|
| COMMUNICATOR 231 | 52ch (FOR COMMUNICATION) | 56ch (FOR DFS MONITORING) | 60ch (FOR DFS MONITORING) |
| COMMUNICATOR 232 | 124ch (FOR DFS MONITORING) | 104ch (FOR COMMUNICATION) | 108ch (FOR COMMUNICATION) |
| | 36ch (FOR INFORMATION COMMUNICATION) | | |

T200e

WIRELESS COMMUNICATION TERMINAL, WIRELESS COMMUNICATION SYSTEM, WIRELESS COMMUNICATION METHOD, AND RECORDING MEDIUM

The present application is a continuation application based on International Patent Application No. PCT/JP2016/065274 filed on May 24, 2016, the content of which is incorporated herein by reference.

BACKGROUND OF THE INVENTION

Field of the Invention

The present invention relates to a wireless communication terminal, a wireless communication system, a wireless communication method, and a recording medium.

Description of Related Art

In a wireless local area network (LAN) of a 5 GHz band, the number of usable communication channels is larger than that of a wireless LAN of a 2.4 GHz band. Thus, the wireless LAN of the 5 GHz band is advantageous for performing data transmission of images and the like requiring the securement of communication quality. However, W53 and W56 which are parts of the 5 GHz band are frequency bands used by weather radar and the like. In these frequency bands, implementation of functions for sharing the frequency with the radar is required. This function is called dynamic frequency selection (DFS).

According to DFS, a communication channel is continuously monitored in a state in which radio waves are not emitted from the communication channel for a predetermined time period before the communication channel is used. For example, the predetermined time period is 60 seconds. When it is confirmed that radio waves of radar have not been detected, the communication channel can be used. It is necessary to confirm that the radio waves of the radar have not been detected even while the communication channel is in use as well as before the communication channel is used. Thus, the communication channel in use is also continuously monitored. When the radio waves of the radar have been detected during communication, transmission on the communication channel in use is stopped within a predetermined time period from a timing at which the radio waves of the radar have been detected.

Because a bandwidth of each communication channel is wide in the wireless LAN of the 5 GHz band, there is a high possibility that the communication channels used in a plurality of adjacent wireless communication terminals will overlap (contend). Thus, even when communication control of carrier sense multiple access (CSMA) is performed, the throughput of transmission tends to decrease due to overlapping of communication channels.

For example, in Japanese Patent No. 4886814, technique for reducing an influence due to overlapping of communication channels is disclosed. In the wireless communication terminal, a communication channel different from a communication channel to be used for the communication is monitored simultaneously with communication. When the radio waves of the radar have been detected on a communication channel which is being used for communication, the communication channel used for the communication is switched to the monitored communication channel.

SUMMARY OF THE INVENTION

According to a first aspect of the present invention, a wireless communication terminal includes a plurality of communicators, a radar detection circuit, a channel use confirmation circuit, a channel information acquisition circuit, a channel information notification circuit, a channel determination circuit, and a channel setting circuit. The plurality of communicators perform wireless communication. The radar detection circuit executes a detection process of detecting radio waves of radar on a data communication channel and a monitoring communication channel. The channel use confirmation circuit confirms whether or not the monitoring communication channel is usable for data communication by causing the radar detection circuit to continuously execute the detection process on the monitoring communication channel for a predetermined time period. The channel information acquisition circuit acquires first communication channel information and second communication channel information from a first peripheral terminal located in the periphery of the wireless communication terminal through wireless communication. The first communication channel information indicates the data communication channel set in a communicator of the first peripheral terminal. The second communication channel information indicates the monitoring communication channel set in a communicator of the first peripheral terminal or the communication channel confirmed to be usable for data communication by the channel use confirmation circuit of the first peripheral terminal. The channel information notification circuit notifies the first peripheral terminal of third communication channel information and fourth communication channel information through wireless communication. The third communication channel information indicates the data communication channel set in the communicator of the wireless communication terminal. The fourth communication channel information indicates the monitoring communication channel set in the communicator of the wireless communication terminal or the communication channel confirmed to be usable for data communication by the channel use confirmation circuit of the wireless communication terminal. The channel determination circuit determines communication channels to be set in the plurality of communicators. The channel setting circuit sets the communication channels determined by the channel determination circuit in the plurality of communicators. The first peripheral terminal includes the plurality of communicators, the radar detection circuit, the channel use confirmation circuit, the channel information acquisition circuit, the channel information notification circuit, the channel determination circuit, and the channel setting circuit. The data communication channel and the monitoring communication channel are different from each other. Communication channels set as the data communication channel and the monitoring communication channel are included in a communication channel group. The communication channel group includes a plurality of communication channels. The plurality of communication channels included in the communication channel group are capable of being used by the radar. The plurality of communication channels included in the communication channel group are usable for data communication only when the radio waves of the radar have not been continuously detected for a predetermined time period. The channel determination circuit determines a communication channel different from any of a first communication channel indicated by the first communication channel information and a second communication channel indicated by the second communication channel information as the data communication channel. The channel setting circuit sets the data communication channel determined by the channel determination circuit in one of the plurality of communicators. The channel determination circuit determines a communication channel different from any of the first communication channel and the second communication channel as the monitoring communication channel. The channel setting circuit sets the monitoring communication channel determined by the channel determination circuit in a communicator which is among the plurality of communicators and is different from the communicator in which the data communication channel is set. The channel determination circuit determines a new communication channel as the monitoring communication channel when the radar detection circuit has detected the radio waves of the radar on the data communication channel. The new communication channel is different from any of the first communication channel, the second communication channel, and the data communication channel on which the radio waves of the radar have been detected. The channel setting circuit sets the monitoring communication channel determined by the channel determination circuit in the communicator in which the data communication channel on which the radio waves of the radar have been detected is set. When the radar detection circuit has detected the radio waves of the radar on the data communication channel, the communication channel confirmed to be usable for data communication by the channel use confirmation circuit becomes the data communication channel.

According to a second aspect of the present invention, in the first aspect, the wireless communication terminal may further include a scanning circuit. The scanning circuit executes scanning on a communication channel which is capable of being used for data communication by the first peripheral terminal by using any one of the plurality of communicators. The first peripheral terminal may further include the scanning circuit.

According to a third aspect of the present invention, in the first aspect, the second communication channel information may indicate the monitoring communication channel set in the communicator of the first peripheral terminal and the communication channel confirmed to be usable for data communication by the channel use confirmation circuit of the first peripheral terminal.

According to a fourth aspect of the present invention, in the first aspect, the wireless communication terminal may further include a memory. The memory stores first processing period information, second processing period information, and processing interval information. The first processing period information indicates a first processing period during which the channel information acquisition circuit continuously executes an acquisition process of acquiring the first communication channel information and the second communication channel information. The second processing period information indicates a second processing period during which the channel information acquisition circuit continuously executes the acquisition process. The processing interval information indicates a processing interval. The first processing period is the same as the processing interval or longer than the processing interval. The second processing period is the same as the first processing period or shorter than the first processing period. The channel setting circuit may further set a communication channel which is never used by the radar in any one of the plurality of communicators. The channel information acquisition circuit may execute the acquisition process using the communicator in which the communication channel which is never used by the radar is set. When a predetermined event has occurred, the channel information acquisition circuit may continuously execute the acquisition process. In a case where the channel information acquisition circuit has acquired the first communication channel information and the second communication channel information from a timing at which the channel information acquisition circuit has started the execution of the acquisition process due to occurrence of the predetermined event to a timing at which the first processing period ends, the channel information acquisition circuit continuously executes the acquisition process from a timing at which the channel information acquisition circuit has acquired the first communication channel information and the second communication channel information to a timing at which the second processing period ends. After the second processing period ends, the channel information acquisition circuit may stop the execution of the acquisition process. The channel information acquisition circuit may stop the execution of the acquisition process from a timing at which the execution of the acquisition process has been stopped to a timing at which the processing interval has elapsed. The channel information acquisition circuit may continuously execute the acquisition process during the second processing period after the processing interval elapses from the timing at which the execution of the acquisition process has been stopped.

According to a fifth aspect of the present invention, in the fourth aspect, in a case where the channel information acquisition circuit has not acquired the first communication channel information and the second communication channel information from the timing at which the channel information acquisition circuit has started the execution of the acquisition process due to occurrence of the predetermined event to the timing at which the first processing period ends, the channel information acquisition circuit may stop the execution of the acquisition process.

According to a sixth aspect of the present invention, in the first aspect, the channel information acquisition circuit may further acquire fifth communication channel information and sixth communication channel information from the first peripheral terminal through wireless communication. The fifth communication channel information indicates the data communication channel set in a communicator of a second peripheral terminal located in the periphery of the first peripheral terminal. The sixth communication channel information indicates the monitoring communication channel set in a communicator of the second peripheral terminal or a communication channel confirmed to be usable for data communication by the channel use confirmation circuit of the second peripheral terminal. The second peripheral terminal includes the plurality of communicators, the radar detection circuit, the channel use confirmation circuit, the channel information acquisition circuit, the channel information notification circuit, the channel determination circuit, and the channel setting circuit. The channel information notification circuit may further notify the first peripheral terminal of the first communication channel information and the second communication channel information through wireless communication. The channel determination circuit may determine a communication channel different from any of the first communication channel, the second communication channel, a third communication channel indicated by the fifth communication channel information, and a fourth communication channel indicated by the sixth communication channel information as the data communication channel. The channel determination circuit may determine a communication channel different from any of the first communication channel, the second communication channel, the third communication channel, and the fourth communication channel as the monitoring communication channel. The new communication channel may be different from any of the first communication channel, the second communication channel, the third communication channel, the fourth communication channel, and the data communication channel on which the radio waves of the radar have been detected.

According to a seventh aspect of the present invention, in the first aspect, the channel information acquisition circuit may further acquire seventh communication channel information from the first peripheral terminal through wireless communication. The seventh communication channel information indicates at least one of the data communication channel and the monitoring communication channel on which the radio waves of the radar have been detected in the first peripheral terminal. The channel information notification circuit may further notify the first peripheral terminal of eighth communication channel information through wireless communication. The eighth communication channel information indicates at least one of the data communication channel and the monitoring communication channel on which the radio waves of the radar have been detected in the wireless communication terminal. The channel determination circuit may determine a communication channel different from any of the first communication channel, the second communication channel, and a fifth communication channel indicated by the seventh communication channel information as the data communication channel. The channel determination circuit may determine a communication channel different from any of the first communication channel, the second communication channel, and the fifth communication channel as the monitoring communication channel. The new communication channel may be different from any of the first communication channel, the second communication channel, and the fifth communication channel and different from at least one of the data communication channel and the monitoring communication channel on which the radio waves of the radar have been detected in the wireless communication terminal.

According to an eighth aspect of the present invention, a wireless communication system includes a wireless communication terminal and a first peripheral terminal located in the periphery of the wireless communication terminal. The wireless communication terminal includes a plurality of communicators, a radar detection circuit, a channel use confirmation circuit, a channel information acquisition circuit, a channel information notification circuit, a channel determination circuit, and a channel setting circuit. The plurality of communicators perform wireless communication. The radar detection circuit executes a detection process of detecting radio waves of radar on a data communication channel and a monitoring communication channel. The channel use confirmation circuit confirms whether or not the monitoring communication channel is usable for data communication by causing the radar detection circuit to continuously execute the detection process on the monitoring communication channel for a predetermined time period. The channel information acquisition circuit acquires first communication channel information and second communication channel information from the first peripheral terminal through wireless communication. The first communication channel information indicates the data communication channel set in a communicator of the first peripheral terminal. The second communication channel information indicates the monitoring communication channel set in a communicator of the first peripheral terminal or the communication channel confirmed to be usable for data communication by the channel use confirmation circuit of the first peripheral terminal. The channel information notification circuit notifies the first peripheral terminal of third communication channel information and fourth communication channel information through wireless communication. The third communication channel information indicates the data communication channel set in the communicator of the wireless communication terminal. The fourth communication channel information indicates the monitoring communication channel set in the communicator of the wireless communication terminal or the communication channel confirmed to be usable for data communication by the channel use confirmation circuit of the wireless communication terminal. The channel determination circuit determines communication channels to be set in the plurality of communicators. The channel setting circuit sets the communication channels determined by the channel determination circuit in the plurality of communicators. The first peripheral terminal includes the plurality of communicators, the radar detection circuit, the channel use confirmation circuit, the channel information acquisition circuit, the channel information notification circuit, the channel determination circuit, and the channel setting circuit. The data communication channel and the monitoring communication channel are different from each other. Communication channels set as the data communication channel and the monitoring communication channel are included in a communication channel group. The communication channel group includes a plurality of communication channels. The plurality of communication channels included in the communication channel group are capable of being used by the radar. The plurality of communication channels included in the communication channel group are usable for data communication only when the radio waves of the radar have not been continuously detected for a predetermined time period. The channel determination circuit determines a communication channel different from any of a first communication channel indicated by the first communication channel information and a second communication channel indicated by the second communication channel information as the data communication channel. The channel setting circuit sets the data communication channel determined by the channel determination circuit in one of the plurality of communicators. The channel determination circuit determines a communication channel different from any of the first communication channel and the second communication channel as the monitoring communication channel. The channel setting circuit sets the monitoring communication channel determined by the channel determination circuit in a communicator which is among the plurality of communicators and is different from the communicator in which the data communication channel is set. The channel determination circuit determines a new communication channel as the monitoring communication channel when the radar detection circuit has detected the radio waves of the radar on the data communication channel. The new communication channel is different from any of the first communication channel, the second communication channel, and the data communication channel on which the radio waves of the radar have been detected. The channel setting circuit sets the monitoring communication channel determined by the channel determination circuit in the communicator in which the data communication channel on which the radio waves of the radar have been detected is set. When the radar detection circuit has detected the radio waves of the radar on the data communication channel, the communication channel confirmed to be usable for data communication by the channel use confirmation circuit becomes the data communication channel.

According to a ninth aspect of the present invention, a wireless communication method is a method for use in a wireless communication terminal including a plurality of communicators configured to perform wireless communication. The wireless communication method includes a radar detection step, a channel use confirmation step, a channel information acquisition step, a channel information notification step, a channel determination step, and a channel setting step. The radar detection step includes executing a detection process of detecting radio waves of radar on a data communication channel and a monitoring communication channel by using a radar detection circuit. The channel use confirmation step includes confirming whether or not the monitoring communication channel is usable for data communication by causing the detection circuit to continuously execute the detection process on the monitoring communication channel in the radar detection step for a predetermined time period. The channel information acquisition step includes acquiring first communication channel information and second communication channel information from a first peripheral terminal located in the periphery of the wireless communication terminal through wireless communication. The first communication channel information indicates the data communication channel set in a communicator of the first peripheral terminal. The second communication channel information indicates the monitoring communication channel set in a communicator of the first peripheral terminal or the communication channel confirmed to be usable for data communication in the channel use confirmation step in the first peripheral terminal. The channel information notification step includes notifying the first peripheral terminal of third communication channel information and fourth communication channel information through wireless communication. The third communication channel information indicates the data communication channel set in the communicator of the wireless communication terminal. The fourth communication channel information indicates the monitoring communication channel set in the communicator of the wireless communication terminal or the communication channel confirmed to be usable for data communication in the channel use confirmation step in the wireless communication terminal. The channel determination step includes determining communication channels to be set in the plurality of communicators. The channel setting step includes setting the communication channels determined in the channel determination step in the plurality of communicators. The first peripheral terminal includes the plurality of communicators. The first peripheral terminal executes the radar detection step, the channel use confirmation step, the channel information acquisition step, the channel information notification step, the channel determination step, and the channel setting step. The data communication channel and the monitoring communication channel are different from each other. Communication channels set as the data communication channel and the monitoring communication channel are included in a communication channel group. The communication channel group includes a plurality of communication channels. The plurality of communication channels included in the communication channel group are capable of being used by the radar. The plurality of communication channels included in the communication channel group are usable for data communication only when the radio waves of the radar have not been continuously detected for a predetermined time period. The channel determination step includes determining a communication channel different from any of a first communication channel indicated by the first communication channel information and a second communication channel indicated by the second communication channel information as the data communication channel. The channel setting step includes setting the data communication channel determined in the channel determination step in one of the plurality of communicators. The channel determination step includes determining a communication channel different from any of the first communication channel and the second communication channel as the monitoring communication channel. The channel setting step includes setting the monitoring communication channel determined in the channel determination step in a communicator which is among the plurality of communicators and is different from the communicator in which the data communication channel is set. The channel determination step includes determining a new communication channel as the monitoring communication channel when the radio waves of the radar have been detected on the data communication channel in the radar detection step. The new communication channel is different from any of the first communication channel, the second communication channel, and the data communication channel on which the radio waves of the radar have been detected. The channel setting step includes setting the monitoring communication channel determined in the channel determination step in the communicator in which the data communication channel on which the radio waves of the radar have been detected is set. When the radio waves of the radar have been detected on the data communication channel in the radar detection step, the communication channel confirmed to be usable for data communication in the channel use confirmation step becomes the data communication channel.

According to a tenth aspect of the present invention, a non-transitory computer-readable recording medium saves a program for causing a computer of a wireless communication terminal including a plurality of communicators configured to perform wireless communication to execute a radar detection step, a channel use confirmation step, a channel information acquisition step, a channel information notification step, a channel determination step, and a channel setting step. The radar detection step includes executing a detection process of detecting radio waves of radar on a data communication channel and a monitoring communication channel by using a radar detection circuit. The channel use confirmation step includes confirming whether or not the monitoring communication channel is usable for data communication by causing the detection circuit to continuously execute the detection process on the monitoring communication channel in the radar detection step for a predetermined time period. The channel information acquisition step includes acquiring first communication channel information and second communication channel information from a first peripheral terminal located in the periphery of the wireless communication terminal through wireless communication. The first communication channel information indicates the data communication channel set in a communicator of the first peripheral terminal. The second communication channel information indicates the monitoring communication channel set in a communicator of the first peripheral terminal or the communication channel confirmed to be usable for data communication in the channel use confirmation step in the first peripheral terminal. The channel information notification step includes notifying the first peripheral terminal of third communication channel information and fourth communication channel information through wireless communication. The third communication channel information indicates the data communication channel set in the communicator of the wireless communication terminal. The fourth communication channel information indicates the monitoring communication channel set in the communicator of the wireless communication terminal or the communication channel confirmed to be usable for data communication in the channel use confirmation step in the wireless communication terminal. The channel determination step includes determining communication channels to be set in the plurality of communicators. The channel setting step includes setting the communication channels determined in the channel determination step in the plurality of communicators. The first peripheral terminal includes the plurality of communicators. The first peripheral terminal executes the radar detection step, the channel use confirmation step, the channel information acquisition step, the channel information notification step, the channel determination step, and the channel setting step. The data communication channel and the monitoring communication channel are different from each other. Communication channels set as the data communication channel and the monitoring communication channel are included in a communication channel group. The communication channel group includes a plurality of communication channels. The plurality of communication channels included in the communication channel group are capable of being used by the radar. The plurality of communication channels included in the communication channel group are usable for data communication only when the radio waves of the radar have not been continuously detected for a predetermined time period. The channel determination step includes determining a communication channel different from any of a first communication channel indicated by the first communication channel information and a second communication channel indicated by the second communication channel information as the data communication channel. The channel setting step includes setting the data communication channel determined in the channel determination step in one of the plurality of communicators. The channel determination step includes determining a communication channel different from any of the first communication channel and the second communication channel as the monitoring communication channel. The channel setting step includes setting the monitoring communication channel determined in the channel determination step in a communicator which is among the plurality of communicators and is different from the communicator in which the data communication channel is set. The channel determination step includes determining a new communication channel as the monitoring communication channel when the radio waves of the radar have been detected on the data communication channel in the radar detection step. The new communication channel is different from any of the first communication channel, the second communication channel, and the data communication channel on which the radio waves of the radar have been detected. The channel setting step includes setting the monitoring communication channel determined in the channel determination step in the communicator in which the data communication channel on which the radio waves of the radar have been detected is set. When the radio waves of the radar have been detected on the data communication channel in the radar detection step, the communication channel confirmed to be usable for data communication in the channel use confirmation step becomes the data communication channel.

BRIEF DESCRIPTION OF THE DRAWINGS

FIG. 15 is a block diagram showing a configuration of a wireless communication system according to a third embodiment of the present invention.

FIG. 16 is a reference diagram showing a communication channel information table according to the third embodiment of the present invention.

FIG. 17 is a reference diagram showing a communication channel information table according to a fourth embodiment of the present invention.

FIG. 22 is a reference diagram showing a communication channel information table according to the fifth embodiment of the present invention.

DETAILED DESCRIPTION OF THE INVENTION

Embodiments of the present invention will be described with reference to the drawings.

First Embodiment

Figure 1:
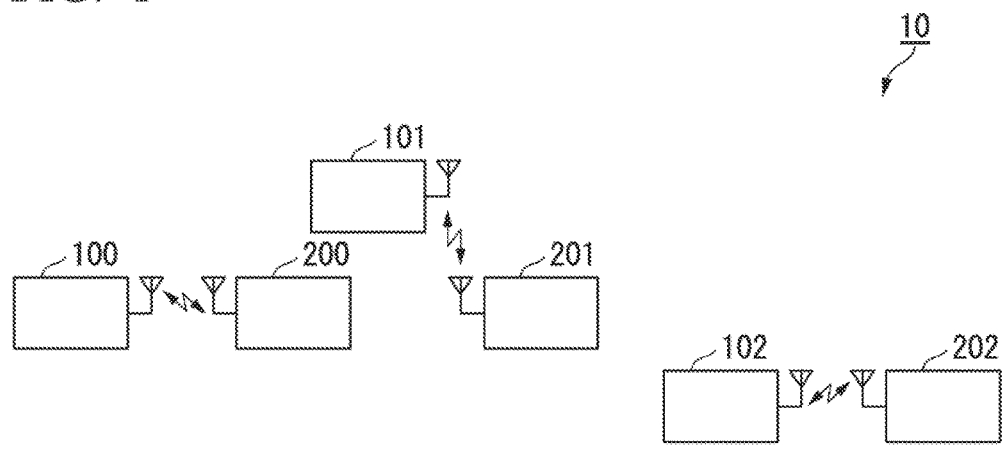
FIG. 1 is a block diagram showing a configuration of a wireless communication system according to a first embodiment of the present invention.

FIG. 1 shows a configuration of a wireless communication system 10 according to a first embodiment of the present invention. As shown in FIG. 1, the wireless communication system 10 includes a transmitter 100, a transmitter 101, a transmitter 102, a receiver 200, a receiver 201, and a receiver 202. The transmitters and the receivers shown in FIG. 1 are wireless communication terminals. The transmitter 100 and the receiver 200 wirelessly communicate with each other. The transmitter 101 and the receiver 201 wirelessly communicate with each other. The transmitter 102 and the receiver 202 wirelessly communicate with each other.

Figure 2:
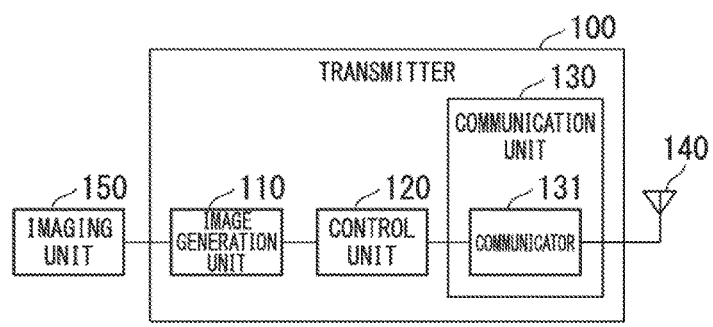
FIG. 2 is a block diagram showing a hardware configuration of a transmitter according to the first embodiment of the present invention.

FIG. 2 shows a hardware configuration of the transmitter 100. As shown in FIG. 2, the transmitter 100 includes an image generation unit 110, a control unit 120, a communication unit 130, and an antenna 140. The communication unit 130 has a communicator 131. The transmitter 100 is connected to an imaging unit 150. In FIG. 1, the imaging unit 150 is omitted. Because configurations of the transmitter 101 and the transmitter 102 are similar to those of the transmitter 100, descriptions of the configurations of the transmitter 101 and the transmitter 102 will be omitted.

A detailed configuration of the transmitter 100 will be described. The imaging unit 150 performs imaging and generates imaging data. The image generation unit 110 is connected to the imaging unit 150. For example, the image generation unit 110 includes a processor. For example, the processor is a central processing unit (CPU). The image generation unit 110 may include an application specific integrated circuit (ASIC) or a field-programmable gate array (FPGA). The image generation unit 110 generates image data by performing image processing on the imaging data generated by the imaging unit 150. For example, the image generation unit 110 generates compressed image data by compressing the imaging data.

For example, the control unit 120 includes a processor. The control unit 120 outputs the image data generated by the image generation unit 110 to the communicator 131. The control unit 120 transmits the image data to the receiver 200 using the communicator 131. The control unit 120 receives a channel change instruction from the receiver 200 using the communicator 131. The channel change instruction includes information of a communication channel newly set in the communicator 131. The control unit 120 changes the communication channel set in the communicator 131 on the basis of the channel change instruction received by the communicator 131. The control unit 120 sets a communication channel indicated by the channel change instruction in the communicator 131. For example, the communication of the channel change instruction is performed for a free time period (a blanking period) of data communication.

For example, a function of at least one of the image generation unit 110 and the control unit 120 can be implemented as a function of software by a processor reading and executing a program including a command for defining the operation of the processor. This program may be provided by, for example, a "computer-readable recording medium" such as a flash memory. Also, the above-described program may be transmitted from a computer having a storage device or the like storing the program via a transmission medium or transmitted to the transmitter 100 by transmission waves in a transmission medium. The "transmission medium" for transmitting the program is a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described function in combination with a program already recorded on the computer, i.e., a so-called differential file (differential program).

The antenna 140 transmits and receives radio waves. The communicator 131 is connected to the antenna 140. The communicator 131 performs wireless communication with the receiver 200 via the antenna 140. The communicator 131 includes a baseband circuit and an RF circuit. The baseband circuit converts a digital signal into an analog signal through D/A conversion. Also, the baseband circuit converts the analog signal output from the RF circuit into a digital signal through A/D conversion and performs a process on the digital signal. The RF circuit modulates the analog signal output from the baseband circuit into an analog signal of a frequency band of carrier waves. The analog signal obtained through the modulation by the RF circuit is output to the antenna 140. Also, the RF circuit demodulates the analog signal of the frequency band of carrier waves output from the antenna 140.

The control unit 120 transmits image data to the receiver 200 using the communicator 131. Specifically, the control unit 120 controls the communicator 131 so that the image data is transmitted to the receiver 200. That is, the control unit 120 causes the communicator 131 to transmit the image data for the receiver 200. Thereby, the communicator 131 transmits the image data to the receiver 200. The control unit 120 receives information from the receiver 200 using the communicator 131. Specifically, the control unit 120 controls the communicator 131 so that information is received from the receiver 200. That is, the control unit 120 causes the communicator 131 to receive the information transmitted from the receiver 200. Thereby, the communicator 131 receives the information from the receiver 200.

Figure 3:
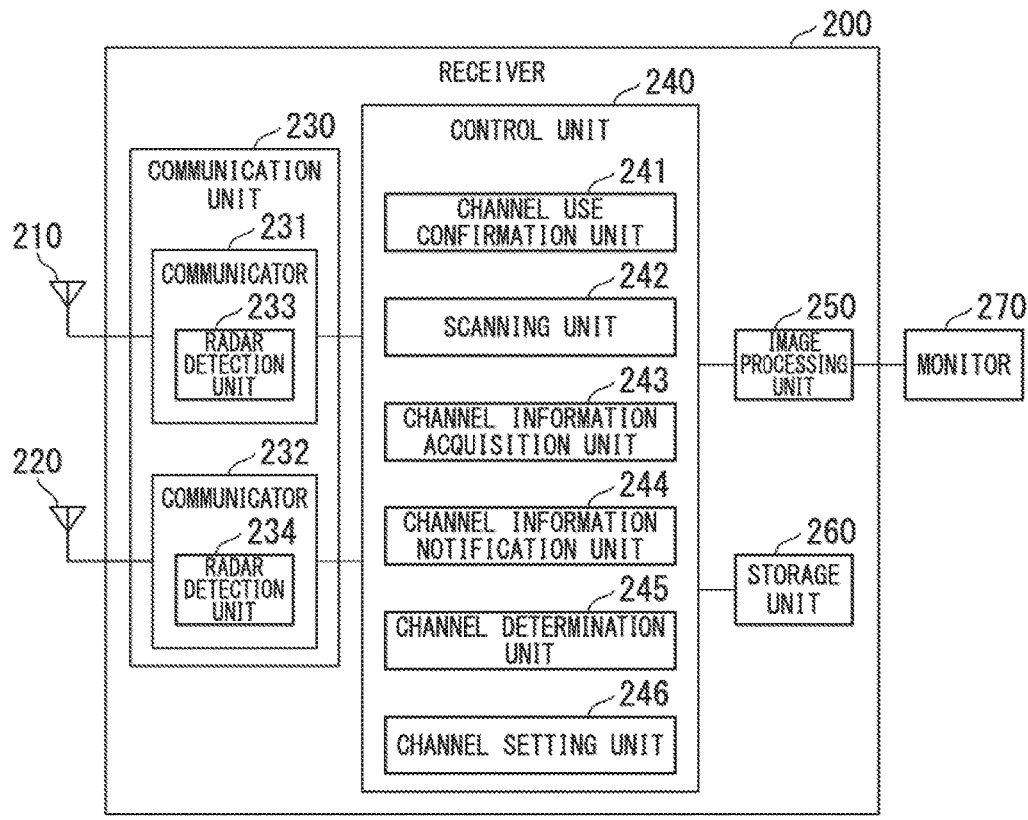
FIG. 3 is a block diagram showing a hardware configuration of a receiver according to the first embodiment of the present invention.

FIG. 3 shows a hardware configuration of the receiver 200. As shown in FIG. 3, the receiver 200 (the wireless communication terminal) includes an antenna 210, an antenna 220, a communication unit 230, a control unit 240, an image processing unit 250, and a storage unit 260. The communication unit 230 includes a communicator 231 and a communicator 232. The communicator 231 includes a radar detection unit 233 (radar detection circuit). The communicator 232 includes a radar detection unit 234 (radar detection circuit). The control unit 240 includes a channel use confirmation unit 241 (channel use confirmation circuit), a scanning unit 242 (scanning circuit), a channel information acquisition unit 243 (channel information acquisition circuit), a channel information notification unit 244 (channel information notification circuit), a channel determination unit 245 (channel determination circuit), and a channel setting unit 246 (channel setting circuit). The receiver 200 is connected to the monitor 270. In FIG. 1, the monitor 270 is omitted. Because configurations of the receiver 201 and the receiver 202 are similar to those of the receiver 200, descriptions of the configurations of the receiver 201 and the receiver 202 will be omitted.

A schematic configuration of the receiver 200 will be described. The receiver 200 includes a plurality of communicators (the communicator 231 and the communicator 232). The plurality of communicators perform wireless communication. The radar detection unit 233 and the radar detection unit 234 execute a detection process of detecting radio waves of radar on a data communication channel and a monitoring communication channel. The channel use confirmation unit 241 confirms whether or not the monitoring communication channel is usable by causing the radar detection unit 233 or the radar detection unit 234 to continuously execute the detection process on the monitoring communication channel for a predetermined time period. The scanning unit 242 performs scanning on a communication channel which is capable of being used by the first peripheral terminal located in the periphery of the receiver 200 by using any one of the plurality of communicators.

The channel information acquisition unit 243 acquires the first communication channel information and the second communication channel information from the first peripheral terminal through wireless communication. The first communication channel information indicates the data communication channel set in the communicator of the first peripheral terminal. The second communication channel information indicates the monitoring communication channel set in the communicator of the first peripheral terminal or a communication channel confirmed to be usable by the channel use confirmation unit 241 of the first peripheral terminal. The channel information notification unit 244 notifies the first peripheral terminal of the third communication channel information and the fourth communication channel information through wireless communication. The third communication channel information indicates the data communication channel set in the communicator of the receiver 200. The fourth communication channel information indicates the monitoring communication channel set in the communicator of the receiver 200 or a communication channel confirmed to be usable by the channel use confirmation unit 241 of the receiver 200. The channel determination unit 245 determines communication channels to be set in the plurality of communicators. The channel setting unit 246 sets the communication channels determined by the channel determination unit 245 in a plurality of communicators.

The first peripheral terminal includes a plurality of communicators (the communicator 231 and the communicator 232), the radar detection unit 233, the radar detection unit 234, the channel use confirmation unit 241, the scanning unit 242, the channel information acquisition unit 243, the channel information notification unit 244, the channel determination unit 245, and the channel setting unit 246. The data communication channel and the monitoring communication channel are different from each other. The communication channels set as the data communication channel and the monitoring communication channel are included in a communication channel group. The communication channel group includes a plurality of communication channels. The plurality of communication channels included in the communication channel group are capable of being used by the radar. The plurality of communication channels included in the communication channel group can be used only when the radio waves of the radar have not been continuously detected for a predetermined time period.

The channel determination unit 245 determines a communication channel different from any of the first communication channel indicated by the first communication channel information and the second communication channel indicated by the second communication channel information as the data communication channel. The channel setting unit 246 sets the data communication channel determined by the channel determination unit 245 in one of the plurality of communicators. The channel determination unit 245 determines a communication channel different from any of the first communication channel and the second communication channel as the monitoring communication channel. The channel setting unit 246 sets the monitoring communication channel determined by the channel determination unit 245 in a communicator which is among the plurality of communicators and is different from the communicator in which the data communication channel is set.

When the radar detection unit 233 or the radar detection unit 234 has detected the radio waves of the radar on the data communication channel, a communication channel confirmed to be usable by the channel use confirmation unit 241 becomes the data communication channel. When the radar detection unit 233 or the radar detection unit 234 has detected the radio waves of the radar on the data communication channel, the channel determination unit 245 determines a new communication channel as the monitoring communication channel. The new communication channel is different from any of the first communication channel, the second communication channel, and the data communication channel on which the radio waves of the radar have been detected. The channel setting unit 246 sets the monitoring communication channel determined by the channel determination unit 245 in the communicator in which the data communication channel on which the radio waves of the radar have been detected is set among the plurality of communicators.

First peripheral terminals located in the periphery of the receiver 200 are receivers with which the receiver 200 can directly wirelessly communicate. In the wireless communication system 10 shown in FIG. 1, the first peripheral terminals are the receiver 201 and the receiver 202. For example, the plurality of communication channels included in the communication channel group are communication channels of W53 or W56 of the 5 GHz band. For example, the predetermined time period for which the radar detection unit of the communicator in which the monitoring communication channel is set continuously executes the detection process is 60 seconds. A plurality of communication channels included in the communication channel group can be used for data communication only when the radio waves of the radar have not been continuously detected for a predetermined time period. The data communication is communication of data of a layer which is higher than a data link layer. The data link layer is one layer of an open systems interconnection (OSI) reference model.

A detailed configuration of the receiver 200 will be described. The receiver 200 performs wireless communication with the transmitter 100, the receiver 201, and the receiver 202. The antenna 210 and the antenna 220 transmit and receive radio waves. The communicator 231 is connected to the antenna 210. The communicator 231 wirelessly communicates with any one of the transmitter 100, the receiver 201, and the receiver 202 via the antenna 210. The communicator 232 is connected to the antenna 220. The communicator 232 wirelessly communicates with any one of the transmitter 100, the receiver 201, and the receiver 202 via the antenna 220. The communicator 231 includes a baseband circuit and an RF circuit in addition to the radar detection unit 233. The communicator 232 has a baseband circuit and an RF circuit in addition to the radar detection unit 234.

For example, the radar detection unit 233 and the radar detection unit 234 include processors. The radar detection unit 233 and the radar detection unit 234 may include an ASIC or an FPGA. The radar detection unit 233 executes a detection process of detecting the radio waves of the radar on the communication channel set in the communicator 231. The radar detection unit 234 executes the detection process of detecting the radio waves of the radar on the communication channel set in the communicator 232. While data communication is being performed, the detection process of detecting the radio waves of the radar on the data communication channel is continuously executed. When the radio waves of the radar have not been continuously detected on the monitoring communication channel for a predetermined time period, the detection process of detecting the radio waves of the radar on the monitoring communication channel is terminated.

For example, at least one of the channel use confirmation unit 241, the scanning unit 242, the channel information acquisition unit 243, the channel information notification unit 244, the channel determination unit 245, and the channel setting unit 246 includes a processor. The at least one of the channel use confirmation unit 241, the scanning unit 242, the channel information acquisition unit 243, the channel information notification unit 244, the channel determination unit 245, and the channel setting unit 246 may include an ASIC or an FPGA.

Each part within the control unit 240 executes a process corresponding to a function of each unit described above. The channel determination unit 245 performs a transmission process of transmitting a channel change instruction in addition to the process according to the above-described function. The channel determination unit 245 transmits the channel change instruction to the transmitter 100 using a communicator for monitoring. The communicator for monitoring is the communicator in which a monitoring communication channel is set among the plurality of communicators.

For example, the channel information acquisition unit 243 transmits a communication channel notification request to the first peripheral terminal using the communicator for monitoring. The channel information acquisition unit 243 receives a response to the communication channel notification request from the first peripheral terminal using the communicator for monitoring. The response includes first communication channel information and second communication channel information about the communication channel which is being used by the first peripheral terminal. The first communication channel information indicates the data communication channel set in the communicator of the first peripheral terminal. The second communication channel information indicates the monitoring communication channel set in the communicator of the first peripheral terminal or a communication channel confirmed to be usable by the channel use confirmation unit 241 of the first peripheral terminal. The channel information acquisition unit 243 may receive a beacon signal transmitted by a communicator for data communication of the first peripheral terminal using the communicator for monitoring. The communicator for data communication is the communicator in which the data communication channel is set among the plurality of communicators. The beacon signal includes the first communication channel information and the second communication channel information. When the beacon signal transmitted by the communicator for data communication of the first peripheral terminal has been received by the communicator for monitoring, the channel information acquisition unit 243 may acquire information of the communication channel set in the communicator for monitoring as the first communication channel information. Therefore, the beacon signal transmitted by the first peripheral terminal need not include the first communication channel information.

For example, the channel information notification unit 244 receives a communication channel notification request from the first peripheral terminal using the communicator for data communication. The channel information notification unit 244 transmits a response to the communication channel notification request to the first peripheral terminal using the communicator for data communication. The response includes third communication channel information and fourth communication channel information about the communication channel which is being used by the receiver 200. The third communication channel information included in the response indicates the data communication channel set in the communicator of the receiver 200. The fourth communication channel information included in the response indicates the monitoring communication channel set in the communicator of the receiver 200 or the communication channel confirmed to be usable by the channel use confirmation unit 241 of the receiver 200. The channel information notification unit 244 may transmit a beacon signal to the first peripheral terminal using the communicator for data communication. The beacon signal includes the third communication channel information and the fourth communication channel information. The beacon signal transmitted to the first peripheral terminal need not include the third communication channel information.

A public action frame defined in IEEE 802.11 may be used for a communication channel notification request and a response thereto. The communication channel notification request and the response thereto may be transmitted by a communicator different from the communicator 231 and the communicator 232. The communicator may correspond to any one communication standard of portable phones including Bluetooth (registered trademark), Zig Bee (registered trademark), W-CDMA, and the like.

The channel information acquisition unit 243 of the receiver 200 acquires the third communication channel information provided through a notification from the first peripheral terminal as the first communication channel information. The channel information acquisition unit 243 of the first peripheral terminal acquires the third communication channel information provided through a notification from the receiver 200 as the first communication channel information. The channel information acquisition unit 243 of the receiver 200 acquires the fourth communication channel information provided through a notification from the first peripheral terminal as the second communication channel information. The channel information acquisition unit 243 of the first peripheral terminal acquires the third communication channel information provided through a notification from the receiver 200 as the fourth communication channel information.

The control unit 240 (the data communication control unit) receives image data from the transmitter 100 using the communicator for data communication. The control unit 240 outputs the received image data to the image processing unit 250.

The control unit 240 (a communication quality detection unit) detects communication quality on the data communication channel. For example, the control unit 240 detects a communication error rate or a received signal strength indicator (RSSI). When the deterioration in communication quality has been detected on the data communication channel, a communication channel confirmed to be usable by the channel use confirmation unit 241 becomes the data communication channel. When the deterioration in communication quality has been detected on the data communication channel, the channel determination unit 245 determines a new communication channel as the monitoring communication channel. The new communication channel is different from any of the first communication channel, the second communication channel, and the data communication channel on which the deterioration in communication quality has been detected. The channel setting unit 246 sets the monitoring communication channel determined by the channel determination unit 245 in the communicator in which the data communication channel on which the deterioration in communication quality has been detected is set among the plurality of communicators. The detection of the communication quality and a change in the communication channel according to the detection are optional elements.

In a fifth embodiment to be described below, the scanning unit 242 is unnecessary. Therefore, the scanning unit 242 is an optional component.

For example, the image processing unit 250 includes a processor. The image processing unit 250 may include an ASIC or an FPGA. The image processing unit 250 performs image processing on image data output from the control unit 240. For example, the image processing unit 250 decompresses compressed image data. The image processing unit 250 outputs the processed image data to the monitor 270. The monitor 270 displays an image on the basis of the image data output from the image processing unit 250.

For example, a function of at least one of the radar detection unit 233, the radar detection unit 234, the control unit 240, and the image processing unit 250 can be implemented as a function of software by a processor reading and executing a program including a command for defining the operation of the processor. An implementation form of such a program is similar to that of the program for implementing the function of the transmitter 100.

The storage unit 260 is a volatile or nonvolatile memory. The storage unit 260 stores the first communication channel information and the second communication channel information. Further, the storage unit 260 stores information of the data communication channel and the monitoring communication channel set in the communicator 231 and the communicator 232 of the receiver 200. The storage unit 260 stores a communication channel information table including the information.

The control unit 240 transmits the information to the transmitter 100 or the first peripheral terminal using the communicator 231 or the communicator 232. Specifically, the control unit 240 controls the communicator 231 or the communicator 232 so that the information is transmitted to the transmitter 100 or the first peripheral terminal. That is, the control unit 240 causes the communicator 231 or the communicator 232 to transmit the information for the transmitter 100 or the first peripheral terminal. Thereby, the communicator 231 or the communicator 232 transmits the information to the transmitter 100 or the first peripheral terminal. The control unit 240 receives image data from the transmitter 100 using the communicator 231 or the communicator 232. Specifically, the control unit 240 controls the communicator 231 or the communicator 232 so that the image data is received from the transmitter 100. That is, the control unit 240 causes the communicator 231 or the communicator 232 to receive the image data transmitted from the transmitter 100. Thereby, the communicator 231 or the communicator 232 receives the image data from the transmitter 100. The control unit 240 receives the information from the first peripheral terminal using the communicator 231 or the communicator 232. Specifically, the control unit 240 controls the communicator 231 or the communicator 232 so that the information is received from the first peripheral terminal. That is, the control unit 240 causes the communicator 231 or the communicator 232 to receive the information transmitted from the first peripheral terminal. Thereby, the communicator 231 or the communicator 232 receives the information from the first peripheral terminal.

In the wireless communication system 10, the imaging unit 150 may be changed to a storage unit configured to store image data. Data transmitted and received between the transmitters and the receivers may be data other than image data. For example, audio data may be transmitted and received between the transmitters and the receivers. For example, the image processing unit 250 may be changed to an audio processing unit configured to convert the audio data into an analog audio signal. For example, the monitor 270 may be changed to a speaker.

Figure 4:
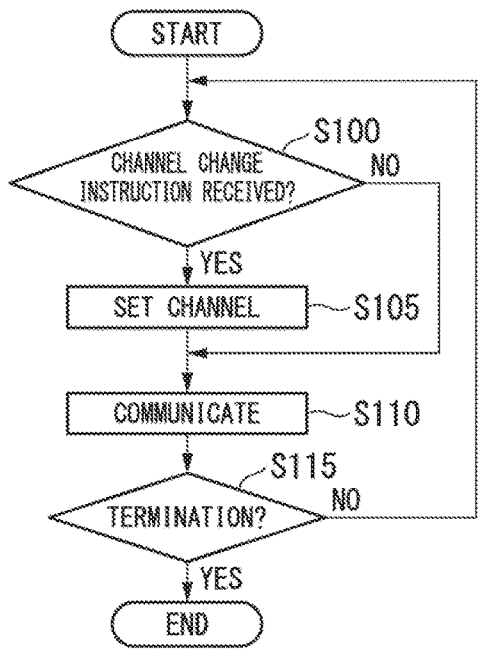
FIG. 4 is a flowchart showing a procedure of an operation of the transmitter according to the first embodiment of the present invention.

An operation of the transmitter 100 will be described. FIG. 4 shows the operation of the transmitter 100. Because operations of the transmitter 101 and the transmitter 102 are similar to those of the transmitter 100, descriptions of the operations of the transmitter 101 and the transmitter 102 will be omitted.

Step S100

The control unit 120 determines whether or not a predetermined event has occurred. The predetermined event is reception of a channel change instruction. When the channel change instruction has been transmitted by the receiver 200, the control unit 120 receives the channel change instruction using the communicator 131. When the control unit 120 determines that the predetermined event has occurred, the processing of step S105 is performed. When the control unit 120 determines that the predetermined event has not occurred, the processing of step S110 is performed.

Step S105

The control unit 120 sets a communication channel indicated by the channel change instruction in the communicator 131.

Step S110

After the communication channel is set in the communicator 131, the control unit 120 wirelessly communicates with the receiver 200 using the communicator 131. Specifically, the control unit 120 transmits image data to the receiver 200 using the communicator 131.

Step S115

The control unit 120 monitors a power-supply switch (not shown). The control unit 120 determines whether or not to terminate an operation of the transmitter 100 by detecting a state of the power-supply switch. When the power-supply switch is in a power-supply off state, the control unit 120 determines to terminate the operation of the transmitter 100. When the power-supply switch is not in the power-supply off state, the control unit 120 determines not to terminate the operation of the transmitter 100. In this case, the processing of step S100 is performed.

Figure 5:
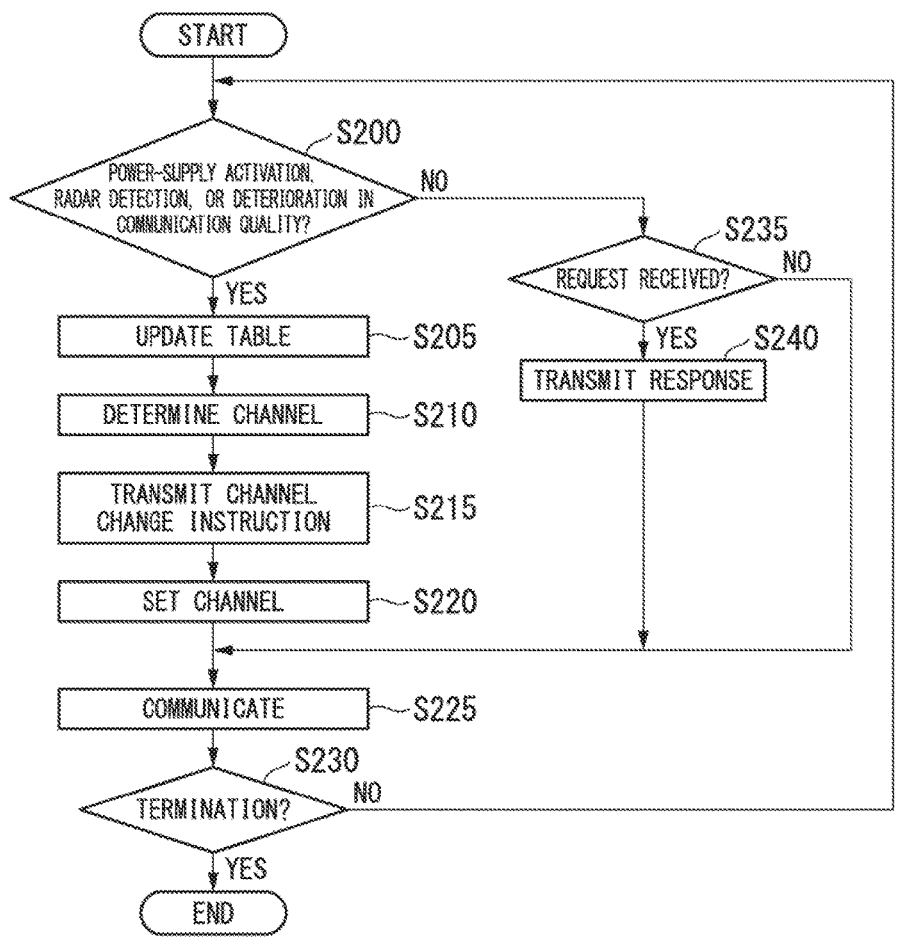
FIG. 5 is a flowchart showing a procedure of an operation of the receiver according to the first embodiment of the present invention.

An operation of the receiver 200 will be described. FIG. 5 shows the operation of the receiver 200. Because operations of the receiver 201 and the receiver 202 are similar to those of the receiver 200, descriptions of the operations of the receiver 201 and the receiver 202 will be omitted.

Step S200

The control unit 240 determines whether or not a predetermined event has occurred. The predetermined event is one of power-supply activation of the receiver 200, radar detection, and deterioration in communication quality. The radar detection is the detection of radio waves of radar on the data communication channel or the monitoring communication channel. The radar detection unit 233 and the radar detection unit 234 execute a detection process of detecting the radio waves of the radar. When the radio waves of the radar have been detected, the radar detection unit 233 and the radar detection unit 234 notify the control unit 240 of the radar detection. Thereby, the control unit 240 determines that the radar detection has occurred. The control unit 240 detects communication quality on the data communication channel. When a communication error rate exceeds a predetermined level or when the RSSI is less than a predetermined level, the control unit 240 determines that the deterioration in communication quality has occurred. When the control unit 240 determines that a predetermined event has occurred, the processing of step S205 is performed. When the control unit 240 determines that a predetermined event has not occurred, the processing of step S235 is performed.

Step S205

The channel information acquisition unit 243 acquires the first communication channel information and the second communication channel information from the first peripheral terminal and updates the communication channel information table. Details of the processing of step S205 will be described below.

Step S210

After the communication channel information table is updated, the channel determination unit 245 determines communication channels to be set in the communicator 231 and the communicator 232. When the event detected in step S200 is power-supply activation of the receiver 200, the channel determination unit 245 determines a communication channel different from any of the first communication channel indicated by the first communication channel information and the second communication channel indicated by the second communication channel information as the data communication channel. The channel determination unit 245 determines a communication channel different from any of the first communication channel and the second communication channel as the monitoring communication channel. The channel determination unit 245 allocates different communication channels for the data communication channel and the monitoring communication channel.

When the event detected in step S200 is the radar detection or the deterioration in communication quality, the channel determination unit 245 determines a new communication channel as the monitoring communication channel. The new communication channel is different from any of the first communication channel, the second communication channel, and the data communication channel on which the radio waves of the radar or the deterioration in communication quality has been detected.

The communication channel information table includes information of a data communication channel and a monitoring communication channel used in the receiver 200 which is an own terminal. The channel determination unit 245 updates the communication channel information table on the basis of the determined communication channel.

When there are a plurality of usable communication channels, the communication channels may be used in an order of channel numbers. Alternatively, the order of communication channels may be predetermined and the communication channels may be used in accordance with the order.

Step S215

After the communication channel is determined, the channel determination unit 245 transmits a channel change instruction to the transmitter 100 using the communicator for monitoring. The channel change instruction includes information of the data communication channel determined in step S210. When the event detected in step S200 is the radar detection on the monitoring communication channel, the data communication channel is not changed. In this case, after the processing of step S210 is performed, the processing of step S220 is performed in a state in which the processing of step S215 is not performed.

Step S220

After the channel change instruction is transmitted, the channel setting unit 246 sets the communication channel determined by the channel determination unit 245 in the communicator 231 and the communicator 232. When the event detected in step S200 is power-supply activation of the receiver 200, the channel setting unit 246 sets the data communication channel determined by the channel determination unit 245 in one of the communicator 231 and the communicator 232. The channel setting unit 246 sets the monitoring communication channel determined by the channel determination unit 245 in the communicator different from the communicator 231 or the communicator 232 in which the data communication channel is set. The channel setting unit 246 updates information of the data communication channel and the monitoring communication channel of the receiver 200 in the communication channel information table.

When the radio waves of the radar or the deterioration in communication quality has been detected on the data communication channel, the communication channel confirmed to be usable by the channel use confirmation unit 241 becomes the data communication channel. Specifically, when the radio waves of the radar or the deterioration in communication quality has been detected on the data communication channel and the radio waves of the radar have not been continuously detected on the monitoring communication channel for a predetermined time period, the communicator in which the monitoring communication channel is set is used as a communicator for data communication.

That is, the monitoring communication channel becomes the data communication channel. The channel setting unit 246 sets the monitoring communication channel determined by the channel determination unit 245 in the communicator 231 or the communicator 232 in which the data communication channel on which the radio waves of the radar or the deterioration in communication quality has been detected is set. The channel setting unit 246 updates information of the data communication channel and the monitoring communication channel of the receiver 200 in the communication channel information table. When the detection process of detecting the radio waves of the radar on the monitoring communication channel is not completed at a timing at which the radio waves of the radar or the deterioration in communication quality has been detected on the data communication channel, the channel setting unit 246 sets the monitoring communication channel after the detection process is completed.

When the radio waves of the radar have been detected on the monitoring communication channel, the channel setting unit 246 sets the monitoring communication channel determined by the channel determination unit 245 in the communicator 231 or the communicator 232 in which the monitoring communication channel on which the radio waves of the radar have been detected is set. The channel setting unit 246 updates information of the monitoring communication channel of the receiver 200 in the communication channel information table.

When the event detected in step S200 is power-supply activation of the receiver 200, the detection process on the data communication channel is necessary before the start of data communication. Thus, after the data communication channel is set in step S220, the channel use confirmation unit 241 confirms whether or not the data communication channel is usable by causing the radar detection unit 233 or 234 to continuously execute the detection process on the data communication channel for a predetermined time period.

When the event detected in step S200 is an event other than power-supply activation of the receiver 200, a detection process on the data communication channel is required during data communication. Thus, after the data communication channel is set in step S220, the control unit 240 causes the radar detection unit to start the detection process on the data communication channel.

After the monitoring communication channel is set in step S220, the channel use confirmation unit 241 causes the radar detection unit to start the detection process on the monitoring communication channel. The channel use confirmation unit 241 confirms whether or not the monitoring communication channel is usable by causing the radar detection unit 233 or the radar detection unit 234 to continuously execute the detection process on the monitoring communication channel for a predetermined time period. When the radio waves of the radar have not been continuously detected on the monitoring communication channel for a predetermined time period, the detection process is terminated.

Step S225

After the communication channel is set, the control unit 240 wirelessly communicates with the transmitter 100 using a communicator for data communication. That is, the control unit 240 receives image data from the transmitter 100 using the communicator for data communication. For example, image data of one or more frames is transmitted by the transmitter 100. The image data of each frame is divided into a plurality of pieces of data. One or more pieces of divided data are received in step S225. By performing the processing of step S225 a plurality of times, image data of each frame is received. The control unit 240 outputs the received image data to the image processing unit 250. The monitor 270 displays an image on the basis of the image data output from the image processing unit 250.

Step S230

After the processing of step S225 is performed, the control unit 240 monitors a power-supply switch (not shown). The control unit 240 determines whether or not to terminate the operation of the receiver 200 by detecting a state of the power-supply switch. When the power-supply switch is in the power-supply off state, the control unit 240 determines to terminate the operation of the receiver 200. When the power-supply switch is not in the power-supply off state, the control unit 240 determines not to terminate the operation of the receiver 200. In this case, the processing of step S200 is performed.

Step S235

When the communication channel notification request has been transmitted by the first peripheral terminal, the channel information notification unit 244 receives the communication channel notification request from the first peripheral terminal using the communicator for data communication. The channel information notification unit 244 monitors the communicator for data communication and determines whether or not the communication channel notification request has been received. When the channel information notification unit 244 determines that the communication channel notification request has been received, the processing of step S240 is performed. When the channel information notification unit 244 determines that the communication channel notification request has not been received, the processing of step S225 is performed.

Step S240

The channel information notification unit 244 transmits a response to the communication channel notification request to the first peripheral terminal using the communicator for data communication. The response includes third communication channel information and fourth communication channel information about the communication channel set in the receiver 200. After the response is transmitted, the processing of step S225 is performed.

Figure 6:
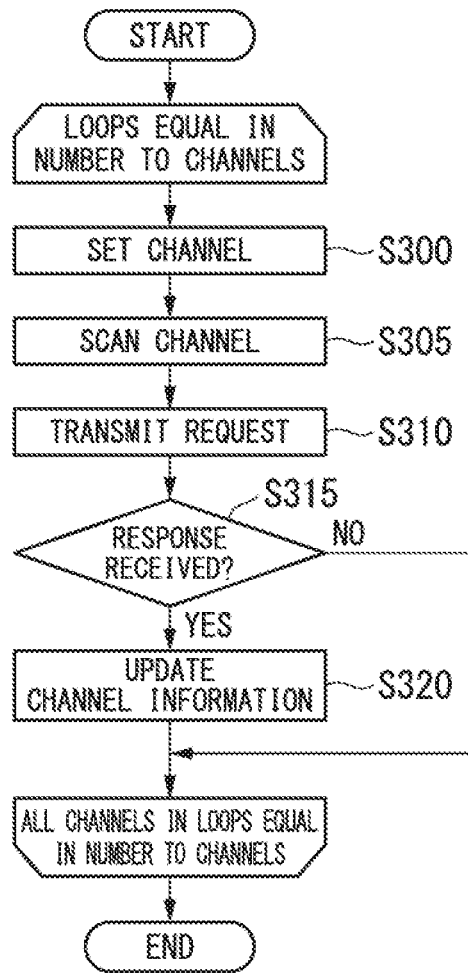
FIG. 6 is a flowchart showing a procedure of an operation of the receiver according to the first embodiment of the present invention.

FIG. 6 shows the operation of the receiver 200 in step S205. The processing of step S205 includes the processing of steps S300 to S320 shown in FIG. 6.

The processing of steps S300 to S320 is performed on all communication channels which are capable of being used as a data communication channel and a monitoring communication channel in the receiver 200. That is, the channel information acquisition unit 243 executes an acquisition process of acquiring the first communication channel information and the second communication channel information on all the communication channels which are capable of being used as the data communication channel and the monitoring communication channel in the receiver 200. Communication channels which are capable of being used as the data communication channel and the monitoring communication channel are the same in each of the receiver 200, the receiver 201, and the receiver 202.

Step S300

While the radar detection unit 233 or the radar detection unit 234 is executing the detection process on the monitoring communication channel, the control unit 240 causes the radar detection unit 233 or 234 to stop the detection process on the monitoring communication channel. The channel setting unit 246 sets one of the communication channels which are capable of being used as the data communication channel and the monitoring communication channel in the receiver 200 in the communicator for monitoring. When the event detected in step S200 is the power-supply activation of the receiver 200, the above-described communication channel is set in any one of the plurality of communicators. When the event detected in step S200 is the power-supply activation of the receiver 200, the communicator is used in steps S305 to S315. When the event detected in step S200 is an event other than power-supply activation of the receiver 200, the communicator for monitoring is used in steps S305 to S315.

Step S305

After the communication channel is set, the scanning unit 242 executes scanning on the communication channel set in step S300 with the communicator for monitoring. The scanning unit 242 determines whether or not there is a first peripheral terminal through the execution of scanning. For example, the scanning unit 242 performs a detection process of detecting a beacon signal transmitted by the first peripheral terminal. When the beacon signal has been detected, the scanning unit 242 determines that there is a first peripheral terminal. When the beacon signal has not been detected, the scanning unit 242 determines that there is no first peripheral terminal.

Step S310

After the scanning is executed, the channel information acquisition unit 243 transmits a communication channel notification request to the first peripheral terminal using the communicator for monitoring. The first peripheral terminal is a terminal detected by the scanning unit 242. When the first peripheral terminal has not been found in step S305, the processing of step S310 is not performed.

Step S315

When a response to the communication channel notification request has been transmitted by the first peripheral terminal, the channel information acquisition unit 243 receives the response from the first peripheral terminal using the communicator for monitoring. After the communication channel notification request is transmitted, the channel information acquisition unit 243 monitors the communicator for monitoring and determines whether or not the response has been received. When the channel information acquisition unit 243 determines that the response has been received, the processing of step S320 is performed. When the channel information acquisition unit 243 determines that the response has not been received, the processing of step S300 is performed on the next communication channel or the processing of step S205 is terminated.

Step S320

The channel information acquisition unit 243 updates the communication channel information table stored in the storage unit 260 on the basis of the first communication channel information and the second communication channel information included in the received response. As a result, the communication channel information table includes information of the data communication channel and the monitoring communication channel used in the receiver 200 which is an own terminal. Further, the communication channel information table includes information of the data communication channel and the monitoring communication channel used in the first peripheral terminal. After the processing of step S320 is completed, the processing of step S300 is performed on the next communication channel or the processing of step S205 is terminated.

As described above, a communication method for the channel change instruction and the communication channel notification request is not limited to the above method.

Figure 7:
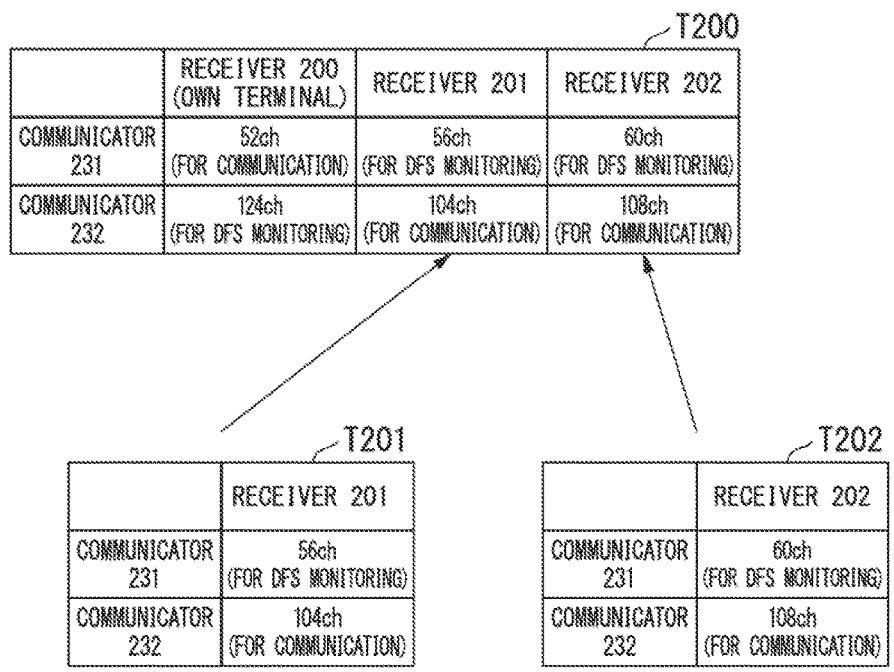
FIG. 7 is a reference diagram showing a communication channel information table according to the first embodiment of the present invention.

FIG. 7 shows an example of communication channel information tables stored in the receiver 200, the receiver 201, and the receiver 202. A communication channel information table T200 is stored in the storage unit 260 of the receiver 200. A communication channel information table T201 is stored in the storage unit 260 of the receiver 201. A communication channel information table T202 is stored in the storage unit 260 of the receiver 202.

The communication channel information table T201 includes first communication channel information and second communication channel information of the receiver 201. The first communication channel information of the receiver 201 indicates a data communication channel (104 ch) set in the communicator 232 of the receiver 201. The second communication channel information of the receiver 201 indicates a monitoring communication channel (56 ch) set in the communicator 231 of the receiver 201.

The communication channel information table T202 includes first communication channel information and second communication channel information of the receiver 202. The first communication channel information of the receiver 202 indicates a data communication channel (108 ch) set in the communicator 232 of the receiver 202. The second communication channel information of the receiver 202 indicates a monitoring communication channel (60 ch) set in the communicator 231 of the receiver 202.

The communication channel information table T200 includes third communication channel information and fourth communication channel information of the receiver 200. The third communication channel information of the receiver 200 indicates a data communication channel (52 ch) set in the communicator 231 of the receiver 200. The fourth communication channel information of the receiver 200 indicates a monitoring communication channel (124 ch) set in the communicator 232 of the receiver 200. Further, the communication channel information table T200 includes first communication channel information and second communication channel information of each of the receiver 201 and the receiver 202. As described above, the communication channel information table T201 includes first communication channel information and second communication channel information of the receiver 201, and the communication channel information table T202 includes first communication channel information and second communication channel information of the receiver 202. A notification of the information of the communication channel information table T201 is provided from the receiver 201 to the receiver 200 through a response to the communication channel notification request. Likewise, a notification of the information of the communication channel information table T202 is provided from the receiver 202 to the receiver 200 through a response to the communication channel notification request.

An example of communication channel setting based on the communication channel information table T200 will be described. After the power-supply activation of the receiver 200, a data communication channel (52 ch) is set in the communicator 231 and a monitoring communication channel (124 ch) is set in the communicator 232 in the receiver 200. When the radio waves of the radar have been detected by the radar detection unit 233 of the receiver 200, data communication using the communicator 231 is stopped. Thereafter, data communication using the communicator 232 is started. At this time, the monitoring communication channel (124 ch) becomes a new data communication channel (124 ch). A new monitoring communication channel is set in the communicator 231. The new monitoring communication channel is different from any of a data communication channel (104 ch) of the receiver 201, a data communication channel (108 ch) of the receiver 202, a monitoring communication channel (56 ch) of the receiver 201, and a monitoring communication channel (60 ch) of the receiver 202. The new monitoring communication channel is different from any of the communication channel (52 ch) on which the radio waves of the radar have been detected in the receiver 200 and the new data communication channel (124 ch) of the receiver 200.

The wireless communication terminal of each aspect of the present invention need not include at least one of the image processing unit 250 and the storage unit 260.

A wireless communication method according to each aspect of the present invention is a method for use in the receiver 200 (a wireless communication terminal) including a plurality of communicators (the communicator 231 and the communicator 232) configured to perform wireless communication. A wireless communication method according to each aspect of the present invention includes a radar detection step, a channel use confirmation step, a channel information acquisition step, a channel information notification step, a channel determination step, and a channel setting step.

In the radar detection step (step S220), the radar detection unit 233 and the radar detection unit 234 execute a detection process of detecting radio waves of radar on the data communication channel and the monitoring communication channel. In the channel use confirmation step (step S220), the channel use confirmation unit 241 confirms whether or not the monitoring communication channel is usable by causing the radar detection unit 233 or the radar detection unit 234 to continuously execute the detection process on the monitoring communication channel for a predetermined time period.

In the channel information acquisition step (step S315), the channel information acquisition unit 243 acquires first communication channel information and second communication channel information from the first peripheral terminal through wireless communication. In the channel information notification step (step S240), the channel information notification unit 244 notifies the first peripheral terminal of third communication channel information and fourth communication channel information through wireless communication. In the channel determining step (step S210), the channel determination unit 245 determines communication channels to be set in the plurality of communicators. In the channel setting step (step S220), the channel setting unit 246 sets the communication channels determined by the channel determination unit 245 in the plurality of communicators.

The wireless communication method according to each aspect of the present invention may further include a scanning step. In the scanning step (step S305), the scanning unit 242 executes scanning on a communication channel which is capable of being used by the first peripheral terminal located in the periphery of the receiver 200 by using any one of the plurality of communicators.

The wireless communication method according to each aspect of the present invention need not have steps other than those corresponding to the radar detection step, the channel use confirmation step, the channel information acquisition step, the channel information notification step, the channel determination step, and the channel setting step.

In the first embodiment, communication channels different from any of the first communication channel and the second communication channel are determined to be a data communication channel and a monitoring communication channel. Thus, the data communication channel and the monitoring communication channel used in the receiver 200 are different from a communication channel in use or a communication channel which is capable of being used in the first peripheral terminal. As a result, overlapping of communication channels to be used by terminals within the wireless communication system 10 can be further reduced.

Modified Example of First Embodiment

Figure 8:
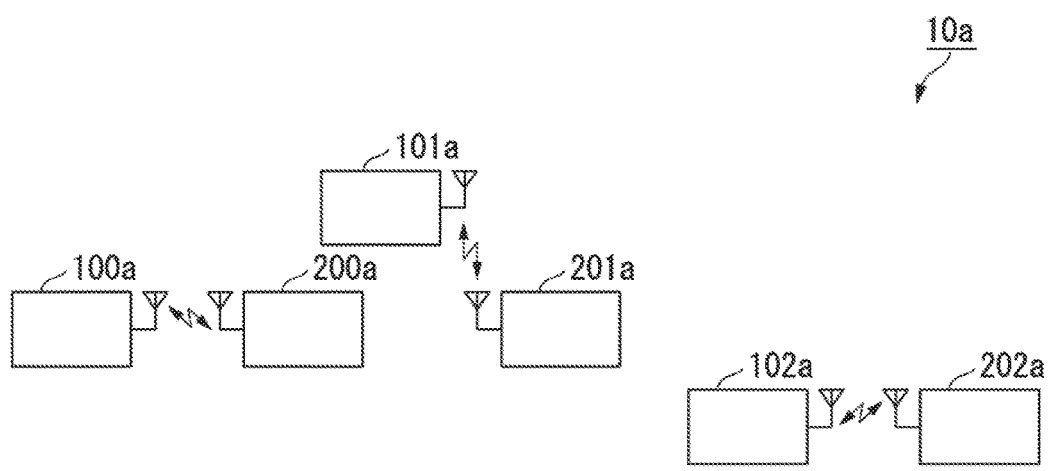
FIG. 8 is a block diagram showing a configuration of a wireless communication system according to a modified example of the first embodiment of the present invention.

FIG. 8 shows a configuration of a wireless communication system 10a according to a modified example of the first embodiment of the present invention. In the wireless communication system 10a, the transmitter 100 shown in FIG. 1 is changed to a transmitter 100a, the transmitter 101 shown in FIG. 1 is changed to a transmitter 101a, and the transmitter 102 shown in FIG. 1 is changed to a transmitter 102a. In the wireless communication system 10a, the receiver 200 shown in FIG. 1 is changed to a receiver 200a, the receiver 201 shown in FIG. 1 is changed to a receiver 201a, and the receiver 202 shown in FIG. 1 is changed to a receiver 202a.

Figure 9:
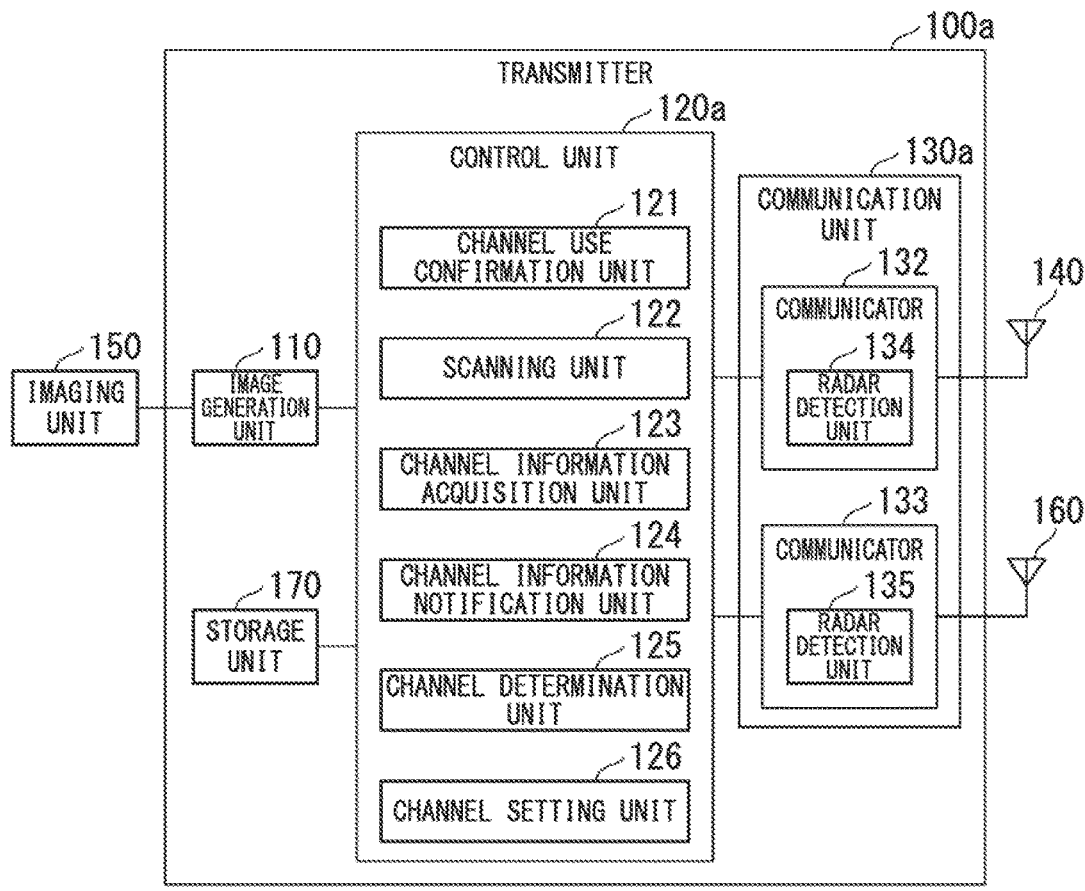
FIG. 9 is a block diagram showing a hardware configuration of a transmitter according to the modified example of the first embodiment of the present invention.

FIG. 9 shows a hardware configuration of the transmitter 100a. Differences from the configuration shown in FIG. 2 will be described in terms of the configuration shown in FIG. 9. Because configurations of the transmitter 101a and the transmitter 102a are similar to those of the transmitter 100a, descriptions of the configurations of the transmitter 101a and the transmitter 102a will be omitted.

In the transmitter 100a, the control unit 120 shown in FIG. 2 is changed to a control unit 120a, and the communication unit 130 shown in FIG. 2 is changed to a communication unit 130a. In the transmitter 100a, an antenna 160 and a storage unit 170 are added.

The control unit 120a includes a channel use confirmation unit 121 (channel use confirmation circuit), a scanning unit 122 (scanning circuit), a channel information acquisition unit 123 (channel information acquisition circuit), a channel information notification unit 124 (channel information notification circuit), a channel determination unit 125 (channel determination circuit), and a channel setting unit 126 (channel setting circuit). The communication unit 130a includes a communicator 132 and a communicator 133. The communicator 132 has a radar detection unit 134. The communicator 133 has a radar detection unit 135.

The channel use confirmation unit 121 has a function equivalent to that of the channel use confirmation unit 241. The scanning unit 122 has a function equivalent to that of the scanning unit 242. The channel information acquisition unit 123 has a function equivalent to that of the channel information acquisition unit 243. The channel information notification unit 124 has a function equivalent to that of the channel information notification unit 244. The channel determination unit 125 has a function equivalent to that of the channel determination unit 245. The channel setting unit 126 has a function equivalent to that of the channel setting unit 246. A function using the communicator 231 or the communicator 232 in the receiver 200 shown in FIG. 3 is changed to a function using the communicator 132 or the communicator 133 in the transmitter 100a. First peripheral terminals located in the periphery of the transmitter 100a are the transmitter 101a and the transmitter 102a.

Antennas 140 and 160 transmit and receive radio waves. The communicator 132 is connected to the antenna 140. The communicator 132 wirelessly communicates with any one of the receiver 200a, the transmitter 101a, and the transmitter 102a via the antenna 140. The communicator 133 is connected to the antenna 160. The communicator 133 wirelessly communicates with any one of the receiver 200a, the transmitter 101a, and the transmitter 102a via the antenna 160. The radar detection unit 134 has a function equivalent to that of the radar detection unit 233. The radar detection unit 135 has a function equivalent to that of the radar detection unit 234. The communicator 132 includes a baseband circuit and an RF circuit in addition to the radar detection unit 134. The communicator 133 includes a baseband circuit and an RF circuit in addition to the radar detection unit 135.

The storage unit 170 has a function equivalent to that of the storage unit 260. Regarding points other than the above, the configuration shown in FIG. 9 is similar to that shown in FIG. 2.

Figure 10:
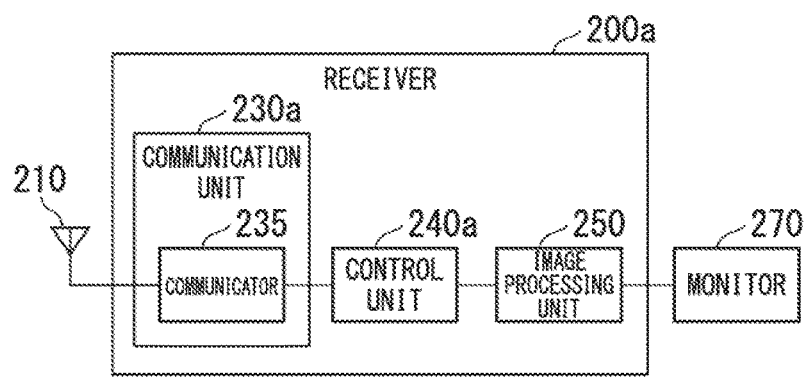
FIG. 10 is a block diagram showing a hardware configuration of a receiver according to the modified example of the first embodiment of the present invention.

FIG. 10 shows a hardware configuration of the receiver 200a. Differences from the configuration shown in FIG. 3 will be described in terms of the configuration shown in FIG. 10. Because configurations of the receiver 201a and the receiver 202a are similar to those of the receiver 200a, descriptions of the configurations of the receiver 201a and the receiver 202a will be omitted.

In the receiver 200a, the communication unit 230 shown in FIG. 3 is changed to a communication unit 230a and the control unit 240 shown in FIG. 3 is changed to a control unit 240a. In the receiver 200a, the antenna 220 and the storage unit 260 are deleted.

The communication unit 230a includes a communicator 235. The communicator 235 is connected to the antenna 210. The communicator 235 wirelessly communicates with the transmitter 100a via the antenna 210.

The control unit 240a executes functions other than those of the channel use confirmation unit 241, the scanning unit 242, the channel information acquisition unit 243, the channel information notification unit 244, the channel determination unit 245, and the channel setting unit 246 in the control unit 240. A function using the communicator 131 in the transmitter 100 is changed to a function using the communicator 235 in the receiver 200a. Regarding points other than the above, the configuration shown in FIG. 10 is similar to that shown in FIG. 3.

An operation of the transmitter 100a is similar to those of the receiver 200 shown in FIGS. 5 and 6. In the operation of the transmitter 100a, communication of a communication channel notification request and a response thereto is performed with the transmitter 101a and the transmitter 102a. An operation of the receiver 200a is similar to that of the transmitter 100 shown in FIG. 4.

Figure 11:
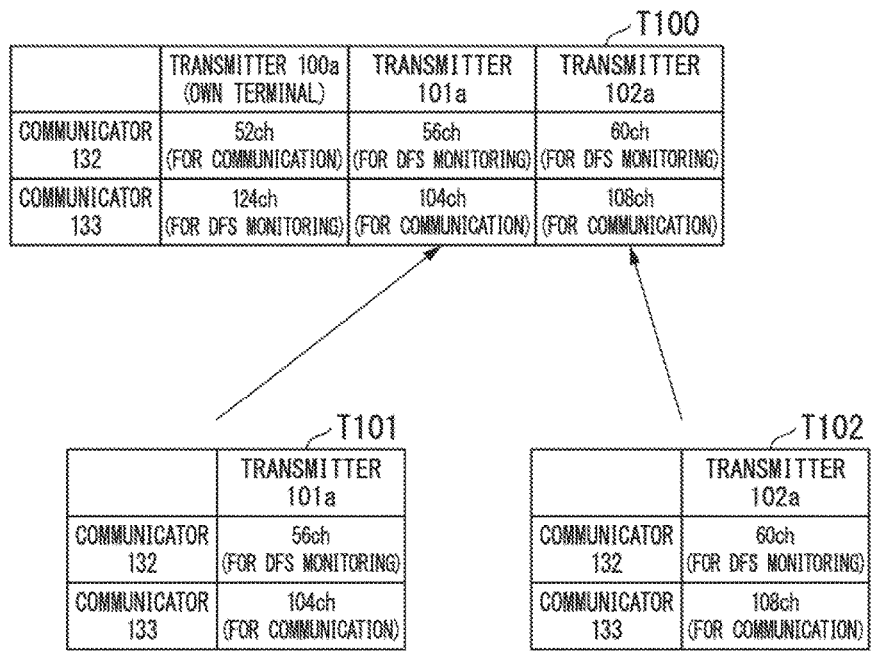
FIG. 11 is a reference diagram showing a communication channel information table according to the modified example of the first embodiment of the present invention.

FIG. 11 shows communication channel information tables stored in the transmitter 100a, the transmitter 101a, and the transmitter 102a. A communication channel information table T100 is stored in the storage unit 170 of the transmitter 100a. A communication channel information table T101 is stored in the storage unit 170 of the transmitter 101a. A communication channel information table T102 is stored in the storage unit 170 of the transmitter 102a.

The communication channel information table T101 includes first communication channel information and second communication channel information of the transmitter 101a. The first communication channel information of the transmitter 101a indicates a data communication channel (104 ch) set in the communicator 133 of the transmitter 101a. The second communication channel information of the transmitter 101a indicates a monitoring communication channel (56 ch) set in the communicator 132 of the transmitter 101a.

The communication channel information table T102 includes first communication channel information and second communication channel information of the transmitter 102a. The first communication channel information of the transmitter 102a indicates a data communication channel (108 ch) set in the communicator 133 of the transmitter 102a. The second communication channel information of the transmitter 102a indicates a monitoring communication channel (60 ch) set in the communicator 132 of the transmitter 102a.

The communication channel information table T100 includes third communication channel information and fourth communication channel information of the transmitter 100a. The third communication channel information of the transmitter 100a indicates a data communication channel (52 ch) set in the communicator 132 of the transmitter 100a. The fourth communication channel information of the transmitter 100a indicates a monitoring communication channel (124 ch) set in the communicator 133 of the transmitter 100a. Further, the communication channel information table T100 includes first communication channel information and second communication channel information of each of the transmitter 101a and the transmitter 102a. As described above, the communication channel information table T101 includes first communication channel information and second communication channel information of the transmitter 101a and the communication channel information table T102 includes first communication channel information and second communication channel information of the transmitter 102a. A notification of the information of the communication channel information table T101 is provided from the transmitter 101a to the transmitter 100a through response to the communication channel notification request. Likewise, a notification of the information of the communication channel information table T102 is provided from the transmitter 102a to the transmitter 100a through a response to the communication channel notification request.

An example of communication channel setting based on the communication channel information table T100 will be described. After the power-supply activation of the transmitter 100a, a data communication channel (52 ch) is set in the communicator 132 and a monitoring communication channel (124 ch) is set in the communicator 133 in the transmitter 100a. When radio waves of radar have been detected by the radar detection unit 134 of the transmitter 100a, data communication using the communicator 132 is stopped. Thereafter, data communication using the communicator 133 is started. At this time, the monitoring communication channel (124 ch) becomes a new data communication channel (124 ch). A new monitoring communication channel is set in the communicator 132. The new monitoring communication channel is different from any of a data communication channel (104 ch) of the transmitter 101a, a data communication channel (108 ch) of the transmitter 102*a*, a monitoring communication channel (56 ch) of the transmitter 101*a*, and a monitoring communication channel (60 ch) of the transmitter 102*a*. The new monitoring communication channel is different from any of the communication channel (52 ch) on which radio waves of radar have been detected in the transmitter 100*a* and the new data communication channel (124 ch) of the transmitter 100*a*.

The wireless communication terminal of each aspect of the present invention need not have the image generation unit 110.

In a modified example of the first embodiment, communication channels different from any of the first communication channel and the second communication channel are determined to be a data communication channel and a monitoring communication channel. Thus, the data communication channel and the monitoring communication channel used in the receiver 200*a* are different from a communication channel in use or a communication channel which is capable of being used in the first peripheral terminal. As a result, overlapping of communication channels to be used by terminals within the wireless communication system 10*a* can be further reduced.

Second Embodiment

Figure 12:
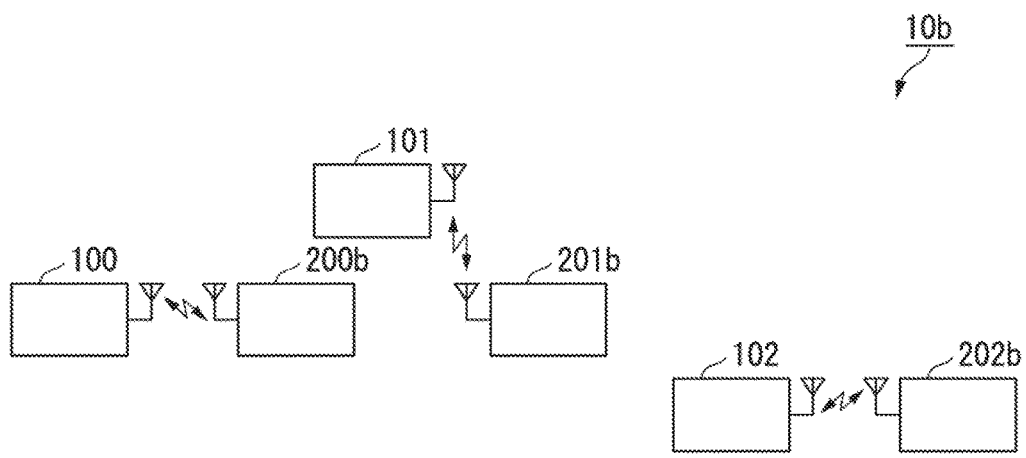
FIG. 12 is a block diagram showing a configuration of a wireless communication system according to a second embodiment of the present invention.

FIG. 12 shows a configuration of a wireless communication system 10*b* according to the second embodiment of the present invention. In the wireless communication system 10*b*, the receiver 200 shown in FIG. 1 is changed to a receiver 200*b*, the receiver 201 shown in FIG. 1 is changed to a receiver 201*b*, and the receiver 202 shown in FIG. 1 is changed to a receiver 202*b*.

Figures 13, 14:
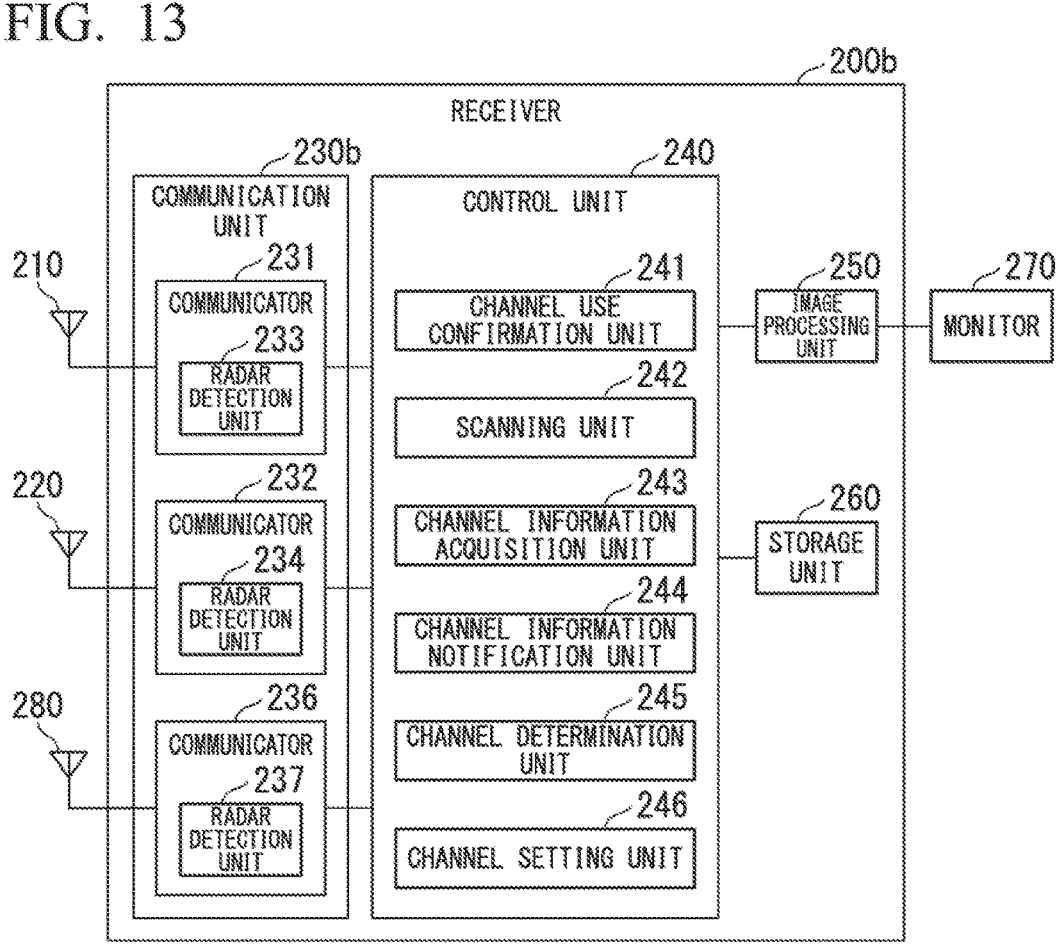
FIG. 13 is a block diagram showing a hardware configuration of a receiver according to the second embodiment of the present invention.
FIG. 14 is a reference diagram showing a communication channel information table according to the second embodiment of the present invention.

FIG. 13 shows a hardware configuration of the receiver 200*b*. Differences from the configuration shown in FIG. 3 will be described in terms of the configuration shown in FIG. 13. Because configurations of the receiver 201*b* and the receiver 202*b* are similar to those of the receiver 200*b*, descriptions of the configurations of the receiver 201*b* and the receiver 202*b* will be omitted.

In the receiver 200*b*, the communication unit 230 shown in FIG. 3 is changed to a communication unit 230*b*. The receiver 200*b* further includes an antenna 280.

The communication unit 230*b* includes a communicator 231, a communicator 232, and a communicator 236. The communicator 231 is the same as the communicator 231 shown in FIG. 3 and the communicator 232 is the same as the communicator 232 shown in FIG. 3. The communicator 236 includes a radar detection unit 237 (radar detection circuit). The communicator 236 performs wireless communication. The radar detection unit 237 executes a detection process of detecting radio waves of radar on a data communication channel and a monitoring communication channel. The communicator 236 includes a baseband circuit and an RF circuit in addition to the radar detection unit 237.

The antenna 280 transmits and receives radio waves. The communicator 236 is connected to the antenna 280. The communicator 236 wirelessly communicates with any one of the transmitter 100, the receiver 201*b*, and the receiver 202*b* via the antenna 280. For example, the radar detection unit 237 includes a processor. The radar detection unit 237 may include an ASIC or an FPGA. The radar detection unit 237 executes a detection process of detecting radio waves of radar on the communication channel set in the communicator 236.

A communication channel information table stored in the storage unit 260 includes information of a data communication channel, a monitoring communication channel, and a standby communication channel used in the receiver 200*b* which is an own terminal. The standby communication channel is a communication channel confirmed to be usable by the channel use confirmation unit 241. Furthermore, the communication channel information table includes information of a data communication channel, a monitoring communication channel, and a standby communication channel used in the first peripheral terminal. Regarding points other than the above, the configuration shown in FIG. 13 is similar to that shown in FIG. 3.

After the power-supply activation of the receiver 200*b*, a data communication channel is set in any one of three communicators and a monitoring communication channel is set in any two of the three communicators. A determination method of determining each communication channel is similar to that in the first embodiment. The two communication channels for monitoring set in the two communicators are different from each other. The channel use confirmation unit 241 causes the radar detection unit to continuously execute the detection process on three communication channels for a predetermined time period. When radio waves of the radar have not been detected on each communication channel for a predetermined time period, the detection process is terminated. Thereafter, data communication using a communicator for data communication is started. The channel setting unit 246 updates information of the data communication channel of the receiver 200*b* in the communication channel information table.

After the detection process is completed, the control unit 240 (a communication quality detection unit) compares communication qualities in the two communication channels for monitoring. The communicator in which a communication channel with better communication quality from the two communication channels for monitoring is set is used as a standby communicator. That is, the communication channel with better communication quality from the two communication channels for monitoring becomes the standby communication channel. A communication channel with poorer communication quality from the two communication channels for monitoring is changed to a new monitoring communication channel. The channel determination unit 245 determines the new monitoring communication channel. The new monitoring communication channel is different from any of the first communication channel, the second communication channel, the data communication channel, and the communication channel on which the detection process of detecting the radio waves of the radar has been executed for a predetermined time period. The channel setting unit 246 sets the new monitoring communication channel determined by the channel determination unit 245 in the communicator in which a monitoring communication channel with poorer communication quality is set. In the communication channel information table, the channel setting unit 246 updates information of the monitoring communication channel and the standby communication channel of the receiver 200*b*. The channel use confirmation unit 241 causes the radar detection unit to start the detection process on the new monitoring communication channel.

When the detection process on the monitoring communication channel has been completed, the control unit 240 compares first communication quality in the monitoring communication channel with second communication quality in the standby communication channel. When the first communication quality is better than the second communication quality, the communicator in which the monitoring communication channel is set is used as a standby communicator, and the communicator in which the standby communication channel is set is used as a communicator for monitoring. In other words, the monitoring communication channel becomes the standby communication channel, and the standby communication channel becomes the monitoring communication channel. The channel determination unit 245 determines a new monitoring communication channel. The new monitoring communication channel is different from any of the first communication channel, the second communication channel, the data communication channel, and the communication channel on which the detection process of detecting the radio waves of the radar has been executed for a predetermined time period. The channel setting unit 246 sets the new monitoring communication channel determined by the channel determination unit 245 in the communicator in which a standby communication channel with poorer communication quality is set. In the communication channel information table, the channel setting unit 246 updates information of the monitoring communication channel and the standby communication channel of the receiver 200*b*. The channel use confirmation unit 241 causes the radar detection unit to start a detection process on the new monitoring communication channel.

When the second communication quality is better than the first communication quality, the channel determination unit 245 determines a new monitoring communication channel. The new monitoring communication channel is different from any of the first communication channel, the second communication channel, the data communication channel, and the communication channel on which the detection process of detecting the radio waves of the radar has been executed for a predetermined time period. The channel setting unit 246 sets the new monitoring communication channel determined by the channel determination unit 245 in the communicator in which a monitoring communication channel with poorer communication quality is set. The channel setting unit 246 updates information of the monitoring communication channel of the receiver 200*b* in the communication channel information table. The channel use confirmation unit 241 causes the radar detection unit to start a detection process on the new monitoring communication channel.

When the radio waves of the radar or the deterioration in communication quality has been detected on a data communication channel, the communicator in which the standby communication channel is set is used as a communicator for data communication. In other words, the standby communication channel becomes the data communication channel. The channel determination unit 245 determines a new monitoring communication channel. The new monitoring communication channel is different from any of the first communication channel, the second communication channel, and the data communication channel on which the radio waves of the radar or the deterioration in communication quality has been detected. The channel setting unit 246 sets the monitoring communication channel determined by the channel determination unit 245 in the communicator in which a data communication channel on which the radio waves of the radar or the deterioration in communication quality has been detected is set. After the detection process of detecting the radio waves of the radar on the monitoring communication channel is completed, the communicator in which the monitoring communication channel is set is used as a standby communicator. That is, the monitoring communication channel becomes the standby communication channel. The channel setting unit 246 updates information of the data communication channel, the monitoring communication channel, and the standby communication channel of the receiver 200*b* in the communication channel information table. The channel use confirmation unit 241 causes the radar detection unit to start a detection process on a new monitoring communication channel.

In the second embodiment, the second communication channel information indicates the monitoring communication channel set in the communicator of the first peripheral terminal and the communication channel confirmed to be usable by the channel use confirmation unit 241 of the first peripheral terminal (the standby communication channel).

FIG. 14 shows an example of a communication channel information table stored in the receiver 200*b*. A communication channel information table T200*b* is stored in the storage unit 260 of the receiver 200*b*.

The communication channel information table T200*b* includes third communication channel information and fourth communication channel information of the receiver 200*b*. The third communication channel information of the receiver 200*b* indicates a data communication channel (52 ch) set in the communicator 231 of the receiver 200*b*. The fourth communication channel information of the receiver 200*b* indicates a standby communication channel (100 ch) set in the communicator 232 of the receiver 200*b* and a monitoring communication channel (124 ch) set in the communicator 236 of the receiver 200*b*. Further, the communication channel information table T200*b* includes first communication channel information and second communication channel information of each of the receivers 201*b* and 202*b*. The first communication channel information of the receiver 201*b* indicates a data communication channel (104 ch) set in the communicator 232 of the receiver 201*b*. The second communication channel information of the receiver 201*b* indicates a monitoring communication channel (56 ch) set in the communicator 231 of the receiver 201*b* and a standby communication channel (128 ch) set in the communicator 236 of the receiver 201*b*. The first communication channel information of the receiver 202*b* indicates a data communication channel (108 ch) set in the communicator 232 of the receiver 202*b*. The second communication channel information of the receiver 202*b* indicates a monitoring communication channel (60 ch) set in the communicator 231 of the receiver 202*b* and a standby communication channel (132 ch) set in the communicator 236 of the receiver 202*b*.

An example of communication channel setting based on the communication channel information table T200*b* will be described. In the receiver 200*b*, a data communication channel (52 ch) is set in the communicator 231, a standby communication channel (100 ch) is set in the communicator 232, and a monitoring communication channel (124 ch) is set in the communicator 236. When the radio waves of the radar have been detected by the radar detection unit 233 of the receiver 200*b*, data communication using the communicator 231 is stopped. Thereafter, data communication using the communicator 232 is started. At this time, the standby communication channel (100 ch) becomes a new data communication channel (100 ch). A new monitoring communication channel is set in the communicator 231. The new monitoring communication channel is different from any of a data communication channel (104 ch) of the receiver 201*b*, a data communication channel (108 ch) of the receiver 202*b*, a monitoring communication channel (56 ch) of the receiver 201*b*, a monitoring communication channel (60 ch) of the receiver 202*b*, a standby communication channel (128 ch) of the receiver 201*b*, and a standby communication channel (132 ch) of the receiver 202*b*. The new monitoring communication channel is different from any of a communication channel (52 ch) on which the radio waves of the radar have been detected in the receiver 200*b*, a monitoring communication channel (124 ch) of the receiver 200*b*, and a new data communication channel (100 ch) of the receiver 200*b*. After the detection process of detecting the radio waves of the radar on the monitoring communication channel (124 ch) of the receiver 200*b* is completed, the monitoring communication channel (124 ch) of the receiver 200*b* becomes a standby communication channel (124 ch).

Each receiver may have more than three communicators. That is, each receiver may have more than one communicator in which the standby channel is set. In the wireless communication system 10*b*, all the receivers have three communicators, but a receiver having two communicators and a receiver having three communicators may be mixed. In the third to fifth embodiments, each receiver may have more than two communicators and a standby communication channel may be set in one or more communicators.

In the second embodiment, the channel determination unit 245 can determine a more optimal monitoring communication channel in consideration of communication qualities of the standby communication channel and the monitoring communication channel.

Third Embodiment

FIG. 15 shows a configuration of a wireless communication system 10 according to a third embodiment of the present invention. A wireless communication terminal constituting the wireless communication system 10 shown in FIG. 15 is the same as the wireless communication terminal constituting the wireless communication system 10 shown in FIG. 1. A wireless communication environment in FIG. 15 is different from that in FIG. 1. In FIG. 15, a receiver 200 and a receiver 201 can wirelessly communicate with each other, and the receiver 201 and a receiver 202 can wirelessly communicate with each other. However, because there is an obstacle 300 between the receiver 200 and the receiver 202, the receiver 200 and the receiver 202 cannot wirelessly communicate with each other.

As described above, a channel information acquisition unit 243 acquires first communication channel information and second communication channel information from the first peripheral terminal through wireless communication. The first communication channel information indicates the data communication channel set in a communicator of the first peripheral terminal. The second communication channel information indicates the monitoring communication channel set in a communicator of the first peripheral terminal or a communication channel confirmed to be usable by a channel use confirmation unit 241 of the first peripheral terminal. As described above, a channel information notification unit 244 notifies the first peripheral terminal of third communication channel information and fourth communication channel information through wireless communication.

The channel information acquisition unit 243 further acquires fifth communication channel information and sixth communication channel information from the first peripheral terminal through wireless communication. The fifth communication channel information indicates the data communication channel set in the communicator of a second peripheral terminal located in the periphery of the first peripheral terminal. The sixth communication channel information indicates the monitoring communication channel set in the communicator of the second peripheral terminal or a communication channel confirmed to be usable by the channel use confirmation unit 241 of the second peripheral terminal. The second peripheral terminal includes a plurality of communicators (a communicator 231 and a communicator 232), a radar detection unit 233, a radar detection unit 234, a channel use confirmation unit 241, a scanning unit 242, a channel information acquisition unit 243, a channel information notification unit 244, a channel determination unit 245, and a channel setting unit 246.

The first peripheral terminal located in the periphery of the receiver 200 is a receiver with which the receiver 200 can directly wirelessly communicate. In the wireless communication system 10 shown in FIG. 1, the first peripheral terminal is the receiver 201. Second peripheral terminals located in the periphery of the receiver 201 which is the first peripheral terminal are receivers with which the receiver 201 can directly wirelessly communicate. In the wireless communication system 10 shown in FIG. 1, the second peripheral terminals are the receiver 200 and the receiver 202.

The channel information notification unit 244 further notifies the first peripheral terminal of first communication channel information and second communication channel information through wireless communication. The channel determination unit 245 determines a communication channel different from any of a first communication channel, a second communication channel, a third communication channel indicated by fifth communication channel information, and a fourth communication channel indicated by sixth communication channel information as a data communication channel. The channel determination unit 245 determines a communication channel different from any of the first communication channel, the second communication channel, the third communication channel, and the fourth communication channel as a monitoring communication channel. When the radar detection unit 233 or the radar detection unit 234 has detected radio waves of radar on the data communication channel, the channel determination unit 245 determines a new communication channel as the monitoring communication channel. The new communication channel is different from any of the first communication channel, the second communication channel, the third communication channel, the fourth communication channel, and the data communication channel on which the radio waves of the radar have been detected.

The channel information notification unit 244 of the first peripheral terminal notifies the receiver 200 of the first communication channel information acquired from the second peripheral terminal. The channel information acquisition unit 243 of the receiver 200 acquires the first communication channel information provided through a notification from the first peripheral terminal as the fifth communication channel information. The channel information acquisition unit 243 of the first peripheral terminal acquires the first communication channel information provided through a notification from the receiver 200 as the fifth communication channel information. The channel information notification unit 244 of the first peripheral terminal notifies the receiver 200 of second communication channel information acquired from the second peripheral terminal. The channel information acquisition unit 243 of the receiver 200 acquires the second communication channel information provided through a notification from the first peripheral terminal as sixth communication channel information. The channel information acquisition unit 243 of the first peripheral terminal acquires the second communication channel information provided through a notification from the receiver 200 as the sixth communication channel information. A method of acquiring the fifth communication channel information and the sixth communication channel information is similar to a method of acquiring the first communication channel information and the second communication channel information. A method of providing a notification of the first communication channel information and the second communication channel information is similar to a method of providing a notification of the third communication channel information and the fourth communication channel information.

The receiver 200 acquires the fifth communication channel information from the first peripheral terminal. The fifth communication channel information is acquired by the first peripheral terminal as the first communication channel information from the second peripheral terminal located in the periphery of the first peripheral terminal. This fifth communication channel information is used as first communication channel information in the first peripheral terminal. The receiver 200 acquires the sixth communication channel information from the first peripheral terminal. The sixth communication channel information is acquired by the first peripheral terminal as the second communication channel information from the second peripheral terminal located in the periphery of the first peripheral terminal. This sixth communication channel information is used as second communication channel information in the first peripheral terminal.

The first peripheral terminal is notified of the third channel information and the fourth communication channel information about the communication channel used in the receiver 200. The receiver 200 is the second peripheral terminal located in the periphery of the first peripheral terminal. The third communication channel information and the fourth communication channel information provided through a notification from the receiver 200 to the first peripheral terminal may be acquired by the receiver 200 from the first peripheral terminal as the fifth communication channel information and the sixth communication channel information.

An operation of the receiver 200 is similar to those shown in FIGS. 5 and 6, except for the following points. The response transmitted in step S240 includes third communication channel information and fourth communication channel information about the communication channel used in the receiver 200. Further, the response includes first communication channel information and second communication channel information acquired from the first peripheral terminal located in the periphery of the receiver 200. That is, the response transmitted in step S240 includes the entire communication channel information table stored in the receiver 200. The response received from the first peripheral terminal includes first communication channel information and second communication channel information about the communication channel used in the first peripheral terminal. Further, the response includes fifth communication channel information and sixth communication channel information used in the second peripheral terminal. That is, the response received from the first peripheral terminal includes the entire communication channel information table stored in the first peripheral terminal.

In step S320, the channel information acquisition unit 243 updates the communication channel information table stored in the storage unit 260 on the basis of the first communication channel information, the second communication channel information, the fifth communication channel information, and the sixth communication channel information included in the received response. As a result, the communication channel information table includes information of the data communication channel and the monitoring communication channel used in the receiver 200 which is an own terminal. Further, the communication channel information table includes information of a data communication channel and a monitoring communication channel used in the first peripheral terminal. Further, the communication channel information table includes information of a data communication channel and a monitoring communication channel used in the second peripheral terminal.

In step S320, only information acquired from a specific first peripheral terminal may be used. For example, only information acquired from the first peripheral terminal having the largest number of second peripheral terminals managed in the communication channel table may be used. In step S320, only information about the receiver 202 with which the receiver 200 cannot communicate may be updated.

In step S210, the channel determination unit 245 determines communication channels to be set in the communicator 231 and the communicator 232. When an event detected in step S200 is power-supply activation of the receiver 200, the channel determination unit 245 determines a communication channel different from any of the first communication channel, the second communication channel, the third communication channel, and the fourth communication channel as a data communication channel. The channel determination unit 245 determines a communication channel different from any of the first communication channel, the second communication channel, the third communication channel, and the fourth communication channel as a monitoring communication channel. The channel determination unit 245 allocates different communication channels for the data communication channel and the monitoring communication channel.

When the event detected in step S200 is radar detection or deterioration in communication quality, the channel determination unit 245 determines a new communication channel as the monitoring communication channel. The new communication channel is different from any of the first communication channel, the second communication channel, the third communication channel, the fourth communication channel, and the data communication channel on which the radio waves of radar or the deterioration in communication quality has been detected.

In the wireless communication system 10 shown in FIG. 15, because an obstacle 300 is located between the receiver 200 and the receiver 202, the receiver 200 and the receiver 202 cannot wirelessly communicate with each other. Thus, the receiver 200 cannot acquire the first communication channel information and the second communication channel information from the receiver 202. On the other hand, because the receiver 201 and the receiver 202 can wirelessly communicate with each other, the receiver 201 can acquire the first communication channel information and the second communication channel information from the receiver 202. The receiver 201 notifies the receiver 200 of the first communication channel information acquired from the receiver 202. The receiver 201 notifies the receiver 200 of the second communication channel information acquired from the receiver 202. The receiver 200 acquires the first communication channel information provided through a notification from the receiver 201 as the fifth communication channel information and acquires the second communication channel information provided through a notification from the receiver 201 as the sixth communication channel information. Thereby, the receiver 200 can acquire information about the communication channel used in the receiver 202.

FIG. 16 shows examples of communication channel information tables stored in the receiver 200 and the receiver 201. A communication channel information table T200c is stored in the storage unit 260 of the receiver 200. The communication channel information table T201c is stored in the storage unit 260 of the receiver 201.

The communication channel information table T201c includes third communication channel information and fourth communication channel information of the receiver 201. The third communication channel information of the receiver 201 indicates a data communication channel (104 ch) set in the communicator 232 of the receiver 201. The fourth communication channel information of the receiver 201 indicates a monitoring communication channel (56 ch) set in the communicator 231 of the receiver 201. Further, the communication channel information table T201c includes fifth communication channel information and sixth communication channel information of the receiver 202. The fifth communication channel information of the receiver 202 indicates a data communication channel (108 ch) set in the communicator 232 of the receiver 202. The sixth communication channel information of the receiver 202 indicates a monitoring communication channel (60 ch) set in the communicator 231 of the receiver 202. The fifth communication channel information and the sixth communication channel information of the receiver 202 are acquired from the receiver 202 by the channel information acquisition unit 243 of the receiver 201.

The communication channel information table T200c includes third communication channel information and fourth communication channel information of the receiver 200. The third communication channel information of the receiver 200 indicates a data communication channel (52 ch) set in the communicator 231 of the receiver 200. The fourth communication channel information of the receiver 200 indicates a monitoring communication channel (124 ch) set in the communicator 232 of the receiver 200. Further, the communication channel information table T200c includes the third communication channel information and the fourth communication channel information of the receiver 201. Further, the communication channel information table T200c includes fifth communication channel information and sixth communication channel information about the communication channel used in the receiver 202. As described above, the communication channel information table T201c includes third communication channel information and fourth communication channel information of the receiver 201 and fifth communication channel information and sixth communication channel information of the receiver 202. A notification of the information of the communication channel information table T201c is provided from the receiver 201 to the receiver 200 through a response to the communication channel notification request.

In the second, fourth, and fifth embodiments, the fifth communication channel information and the sixth communication channel information may be used.

In the third embodiment, even when the receiver 200 and the receiver 202 cannot directly communicate with each other, the receiver 200 can acquire information of a communication channel used by the receiver 202 via another receiver 201. Thus, it is possible to further reduce overlapping of communication channels to be used by terminals within the wireless communication system 10.

Fourth Embodiment

A configuration of a wireless communication system 10 according to a fourth embodiment of the present invention is similar to that of the wireless communication system 10 shown in FIG. 1.

As described above, a channel information acquisition unit 243 acquires first communication channel information and second communication channel information from a first peripheral terminal through wireless communication. The first communication channel information indicates the data communication channel set in a communicator of a first peripheral terminal. The second communication channel information indicates the monitoring communication channel set in the communicator of the first peripheral terminal or a communication channel confirmed to be usable by a channel use confirmation unit 241 of the first peripheral terminal. As described above, a channel information notification unit 244 notifies the first peripheral terminal of the first communication channel information and the second communication channel information through wireless communication.

The channel information acquisition unit 243 further acquires seventh communication channel information from the first peripheral terminal through wireless communication. The seventh communication channel information indicates at least one of a data communication channel and a monitoring communication channel on which radio waves of radar have been detected in the first peripheral terminal. The channel information notification unit 244 further notifies the first peripheral terminal of eighth communication channel information through wireless communication. The eighth communication channel information provided through a notification to the first peripheral terminal indicates at least one of the data communication channel and the monitoring communication channel on which the radio waves of the radar have been detected in a receiver 200.

The channel determination unit 245 determines a communication channel different from any of a first communication channel, a second communication channel, and a fifth communication channel indicated by the seventh communication channel information and different from at least one of a data communication channel and a monitoring communication channel on which the radio waves of the radar have been detected in the receiver 200 as a data communication channel. The channel determination unit 245 determines a communication channel different from any of the first communication channel, the second communication channel, and the fifth communication channel and different from at least one of the data communication channel and the monitoring communication channel on which the radio waves of the radar have been detected in the receiver 200 as a monitoring communication channel. When the radar detection unit 233 or the radar detection unit 234 has detected radio waves of radar on the data communication channel, the channel determination unit 245 determines a new communication channel as the monitoring communication channel. The new communication channel is different from any of the first communication channel, the second communication channel, and the fifth communication channel and different from at least one of the data communication channel and the monitoring communication channel on which the radio waves of the radar have been detected in the receiver 200.

The seventh communication channel information and the eighth communication channel information indicate a data communication channel and a monitoring communication channel. Alternatively, the seventh communication channel information and the eighth communication channel information indicate only one of the data communication channel and the monitoring communication channel. The channel information acquisition unit 243 of the receiver 200 acquires the eighth communication channel information provided through a notification from the first peripheral terminal as the seventh communication channel information. The channel information acquisition unit 243 of the first peripheral terminal acquires the eighth communication channel information provided through a notification from the receiver 200 as the seventh communication channel information. A method of acquiring the seventh communication channel information is similar to the method of acquiring the first communication channel information and the second communication channel information. A method of providing a notification of the eighth communication channel information is similar to the method of providing a notification of the third communication channel information and the fourth communication channel information.

The data communication channel and the monitoring communication channel on which the radio waves of the radar have been detected cannot be used for a predetermined time period. For example, the predetermined time period is 30 minutes. When the radar detection unit 233 or the radar detection unit 234 has detected the radio waves of the radar on a data communication channel, the channel determination unit 245 determines a new communication channel as a monitoring communication channel. The new communication channel is different from at least one of the data communication channel and the monitoring communication channel on which the radio waves of the radar have been detected within a predetermined term in the receiver 200. The predetermined term is a period from a clock time which is earlier than a predetermine clock time by a predetermined time period to the predetermined clock time. For example, the predetermined clock time is a clock time at which the radio waves of the radar have been detected on the data communication channel in use.

An operation of the receiver 200 is similar to those shown in FIGS. 5 and 6, except for the following points. The response transmitted in step S240 includes third communication channel information and fourth communication channel information about the communication channel used in the receiver 200. Further, the response includes eighth communication channel information about the communication channel on which the radio waves of the radar have been detected in the receiver 200. The response received from the first peripheral terminal includes first communication channel information and second communication channel information about the communication channel used in the first peripheral terminal. Further, the response includes seventh communication channel information about the communication channel on which the radio waves of the radar have been detected in the first peripheral terminal.

In step S320, the channel information acquisition unit 243 updates the communication channel information table stored in the storage unit 260 on the basis of the first communication channel information, the second communication channel information, and the seventh communication channel information included in the received response. As a result, the communication channel information table includes information of the data communication channel and the monitoring communication channel used in the receiver 200 which is an own terminal. Further, the communication channel information table includes information of a data communication channel and a monitoring communication channel used in the first peripheral terminal. Further, the communication channel information table includes information of the communication channels on which the radio waves of the radar have been detected set in the receiver 200 and the communicator of the first peripheral terminal.

In step S210, the channel determination unit 245 determines communication channels to be set in the communicator 231 and the communicator 232. When the event detected in step S200 is power-supply activation of the receiver 200, the channel determination unit 245 determines a communication channel different from any of the first communication channel, the second communication channel, and the fifth communication channel as a data communication channel. The channel determination unit 245 determines a communication channel different from any of the first communication channel, the second communication channel, and the fifth communication channel as a monitoring communication channel. The channel determination unit 245 allocates different communication channels for the data communication channel and the monitoring communication channel.

When an event detected in step S200 is radar detection or deterioration in communication quality, the channel determination unit 245 determines a new communication channel as the monitoring communication channel. The new communication channel is different from any of the first communication channel, the second communication channel, and the fifth communication channel. Further, the new communication channel is different from at least one of the data communication channel and the monitoring communication channel on which the radio waves of the radar or the deterioration in communication quality has been detected in the receiver 200.

In step S220, the channel setting unit 246 updates information of the communication channel of the receiver 200 in which the radio waves of the radar have been detected in the communication channel information table.

FIG. 17 shows an example of communication channel information tables stored in the receiver 200, the receiver 201, and the receiver 202. A communication channel information table T200d is stored in the storage unit 260 of the receiver 200. A communication channel information table T201d is stored in the storage unit 260 of the receiver 201. A communication channel information table T202d is stored in the storage unit 260 of the receiver 202.

The communication channel information table T201d includes first communication channel information and second communication channel information of the receiver 201. The first communication channel information of the receiver 201 indicates a data communication channel (104 ch) set in the communicator 232 of the receiver 201. The second communication channel information of the receiver 201 indicates a monitoring communication channel (56 ch) set in the communicator 231 of the receiver 201. Further, the communication channel information table T201d includes seventh communication channel information of the receiver 201. The seventh communication channel information of the receiver 201 includes a communication channel (112 ch) on which the radio waves of the radar have been detected in the receiver 201 and a clock time (9:10:15) at which the radio waves of the radar have been detected.

The communication channel information table T202d includes first communication channel information and second communication channel information of the receiver 202.

The first communication channel information of the receiver 202 indicates a data communication channel (108 ch) set in the communicator 232 of the receiver 202. The second communication channel information of the receiver 202 indicates a monitoring communication channel (60 ch) set in the communicator 231 of the receiver 202. Further, the communication channel information table T202d includes seventh communication channel information of the receiver 202. The seventh communication channel information of the receiver 202 includes the communication channel on which the radio waves of the radar have been detected in the receiver 202 and the clock time at which the radio waves of the radar have been detected. Because the radio waves of the radar have not been detected in the receiver 202, the seventh communication channel information of the receiver 202 is not available.

The communication channel information table T200d includes third communication channel information and fourth communication channel information of the receiver 200. The third communication channel information of the receiver 200 indicates a data communication channel (52 ch) set in the communicator 231 of the receiver 200. The fourth communication channel information of the receiver 200 indicates a monitoring communication channel (124 ch) set in the communicator 232 of the receiver 200. Further, the communication channel information table T200d includes eighth communication channel information of the receiver 200. The eighth communication channel information of the receiver 200 includes a communication channel (116 ch) on which the radio waves of the radar have been detected in the receiver 200 and a clock time (9:00:12) at which the radio waves of the radar have been detected. Further, the communication channel information table T200d includes the third communication channel information, the fourth communication channel information, and the seventh communication channel information of each of the receiver 201 and the receiver 202. As described above, the communication channel information table T201d includes third communication channel information, fourth communication channel information, and seventh communication channel information of the receiver 201 and the communication channel information table T202d includes third communication channel information, fourth communication channel information, and seventh communication channel information of the receiver 202. A notification of the information of the communication channel information table T201d is provided from the receiver 201 to the receiver 200 through a response to the communication channel notification request. Likewise, a notification of the information of the communication channel information table T202d is provided from the receiver 202 to the receiver 200 through a response to the communication channel notification request.

An example of communication channel setting based on the communication channel information table T200d will be described. In the receiver 200, a data communication channel (52 ch) is set in the communicator 231 and a monitoring communication channel (124 ch) is set in the communicator 232. When the radar detection unit 233 of the receiver 200 has detected the radio waves of the radar, data communication using the communicator 231 is stopped. Thereafter, data communication using the communicator 232 is started. At this time, the monitoring communication channel (124 ch) becomes a new data communication channel (124 ch). A new monitoring communication channel is set in the communicator 231. The new monitoring communication channel is different from any of a data communication channel (104 ch) of the receiver 201, a data communication channel (108 ch) of the receiver 202, a monitoring communication channel (56 ch) of the receiver 201, and a monitoring communication channel (60 ch) of the receiver 202. The new monitoring communication channel is different from any of communication channels (52 ch and 116 ch) on which the radio waves of the radar have been detected in the receiver 200 and a new data communication channel (124 ch) of the receiver 200.

For example, radio waves of the radar are detected on a data communication channel (52 ch) of the receiver 200 within 30 minutes from a clock time (9:00:12) at which the radio waves of the radar have been detected on the communication channel (116 ch) of the receiver 200 and a clock time (9:10:15) at which the radio waves of the radar have been detected on the communication channel (112 ch) of the receiver 201. Thus, the new monitoring communication channel is different from any of the communication channel (116 ch) on which the radio waves of the radar have been detected in the receiver 200 and the communication channel (112 ch) on which the radio waves of the radar have been detected in the receiver 201.

In the second, third, and fifth embodiments, the seventh communication channel information and the eighth communication channel information may be used.

In the fourth embodiment, information of a communication channel on which the radio waves of the radar have been detected is shared by receivers, and the use of the communication channel is avoided. Thus, it is possible to further reduce a risk of detection of radio waves of radar on a communication channel used by terminals within the wireless communication system 10.

Fifth Embodiment

Figure 18:
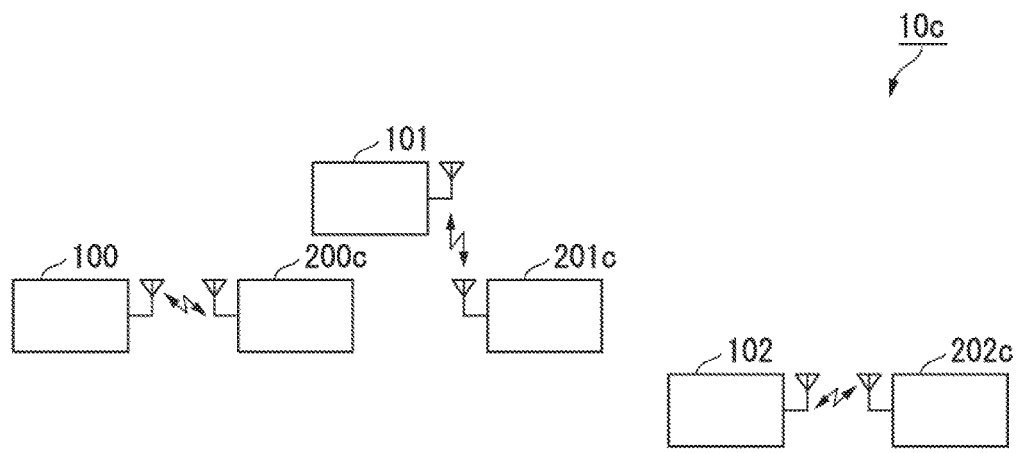
FIG. 18 is a block diagram showing a configuration of a wireless communication system according to a fifth embodiment of the present invention.

FIG. 18 shows a configuration of a wireless communication system 10c according to a fifth embodiment of the present invention. In the wireless communication system 10c, the receiver 200 shown in FIG. 1 is changed to a receiver 200c, the receiver 201 shown in FIG. 1 is changed to a receiver 201c, and the receiver 202 shown in FIG. 1 is changed to a receiver 202c.

Figure 19:
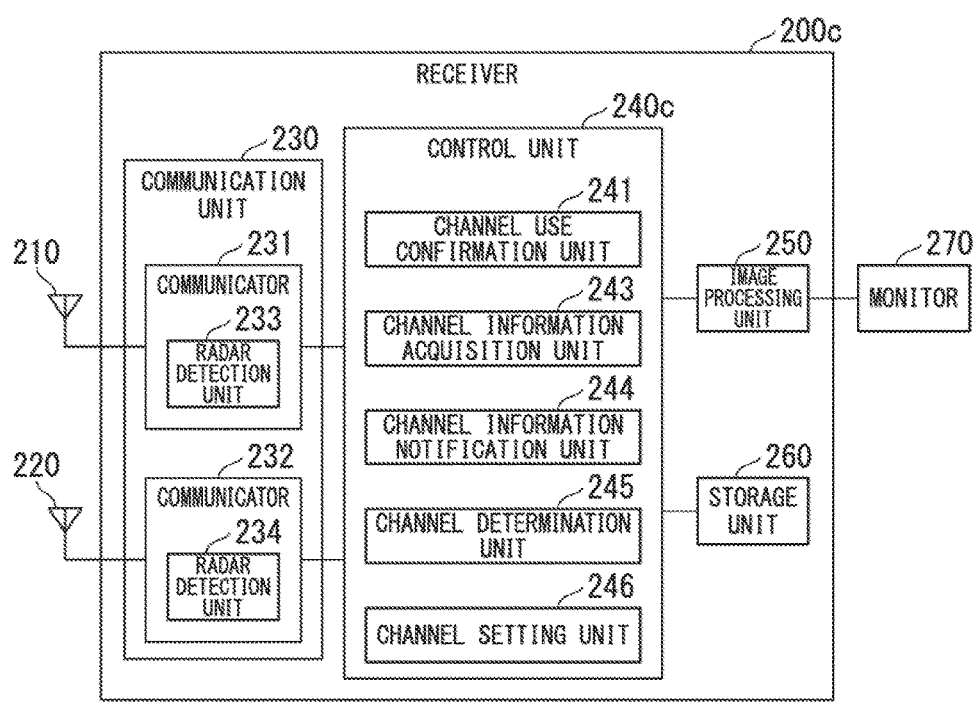
FIG. 19 is a block diagram showing a hardware configuration of a receiver according to the fifth embodiment of the present invention.

FIG. 19 shows a hardware configuration of the receiver 200c. Differences from the configuration shown in FIG. 3 will be described in terms of the configuration shown in FIG. 19. Because configurations of the receiver 201c and the receiver 202c are similar to those of the receiver 200c, descriptions of the configurations of the receiver 201c and the receiver 202c will be omitted.

In the receiver 200c, the control unit 240 shown in FIG. 3 is changed to a control unit 240c. The control unit 240c does not include the scanning unit 242. A configuration within the control unit 240c other than the scanning unit 242 is similar to that within the control unit 240 shown in FIG. 3.

A storage unit 260 stores first processing period information, second processing period information, and processing interval information. The first processing period information indicates a first processing period during which a channel information acquisition unit 243 continuously executes an acquisition process of acquiring the first communication channel information and the second communication channel information. The second processing period information indicates a second processing period during which the channel information acquisition unit 243 continuously executes the acquisition process. The processing interval information indicates a processing interval. The first processing period is the same as the processing interval or longer than the processing interval. The second processing period is the same as the first processing period or shorter than the first processing period.

The channel setting unit 246 further sets a communication channel which is never used by the radar in any one of the plurality of communicators. The channel information acquisition unit 243 executes an acquisition process of acquiring the first communication channel information and the second communication channel information using the communicator in which a communication channel which is never used by the radar is set. When a predetermined event has occurred, the channel information acquisition unit 243 continuously executes the acquisition process. In a case where the channel information acquisition unit 243 has acquired the first communication channel information and the second communication channel information from a timing at which the channel information acquisition unit 243 has started the execution of the acquisition process due to occurrence of the predetermined event to a timing at which the first processing period ends, the channel information acquisition unit 243 continuously executes the acquisition process from a timing at which the channel information acquisition unit 243 has acquired the first communication channel information and the second communication channel information to a timing at which the second processing period ends. After the second processing period ends, the channel information acquisition unit 243 stops the execution of the acquisition process. The channel information acquisition unit 243 stops the execution of the acquisition process from a timing at which the execution of the acquisition process has been stopped to a timing at which the processing interval has elapsed. The channel information acquisition unit 243 continuously executes the acquisition process during the second processing period after the processing interval elapses from the timing at which the execution of the acquisition process has been stopped.

In a case where the channel information acquisition unit 243 has not acquired the first communication channel information and the second communication channel information from the timing at which the channel information acquisition unit 243 has started the execution of the acquisition process due to the occurrence of the predetermined event to the timing at which the first processing period ends, the channel information acquisition unit 243 stops the execution of the acquisition process.

The channel information notification unit 244 executes a notification process of providing a notification of the first communication channel information and the second communication channel information using the communicator in which a communication channel which is never used by the radar is set. The channel information notification unit 244 continuously executes the notification process during the execution of the acquisition process by the channel information acquisition unit 243. Regarding points other than the above, the configuration shown in FIG. 19 is similar to that shown in FIG. 3.

As described above, the channel information acquisition unit 243 executes the acquisition process using the communicator in which a communication channel which is never used by the radar is set. For example, the channel information acquisition unit 243 executes the acquisition process using the communicator in which a W52 communication channel (36 ch) of a 5 GHz band is set. The detection process of detecting radar waves of the radar is unnecessary in the W52 communication channel of the 5 GHz band. The acquisition process in each receiver is performed synchronously. The communication channel used for the acquisition process is predetermined.

Figure 20:
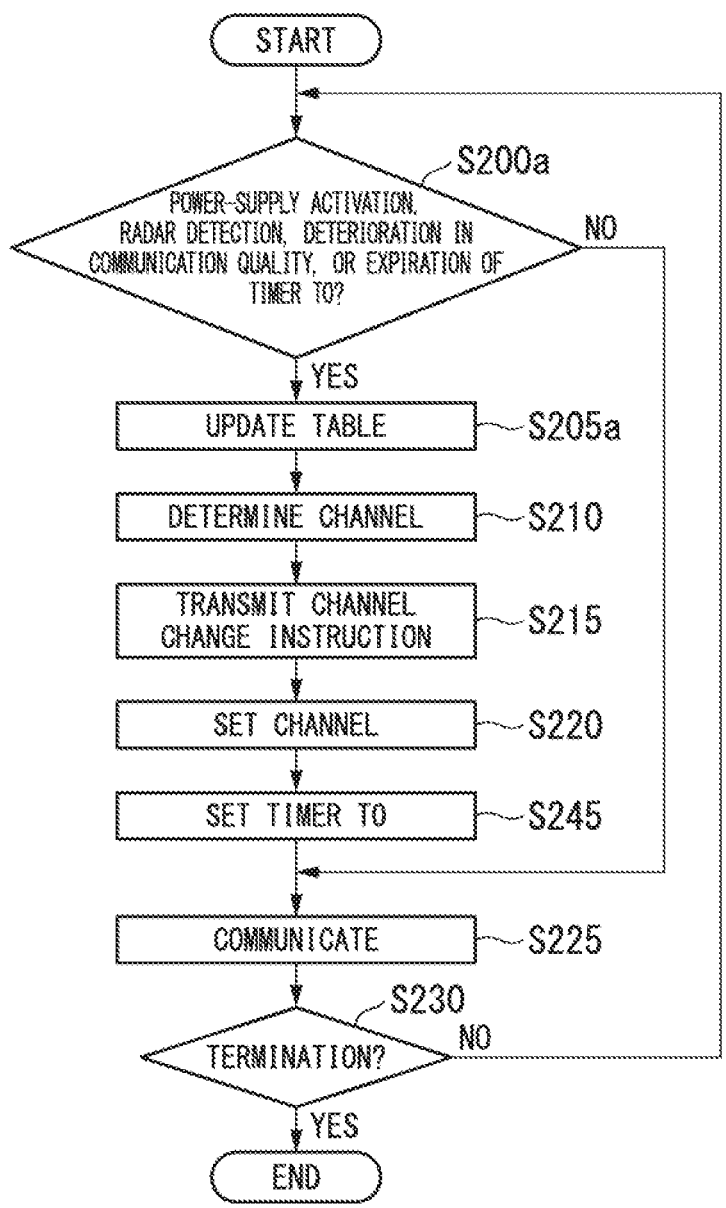
FIG. 20 is a flowchart showing a procedure of an operation of the receiver according to the fifth embodiment of the present invention.

An operation of the receiver 200c will be described. FIG. 20 shows the operation of the receiver 200c. Because the operations of the receiver 201c and the receiver 202c are similar to those of the receiver 200c, descriptions of the operations of the receiver 201c and the receiver 202c will be omitted. The process shown in FIG. 20 will be described in terms of differences from the process shown in FIG. 5. Step S200 shown in FIG. 5 is changed to step S200a, and step S205 shown in FIG. 5 is changed to step S205a. Steps S235 and S240 shown in FIG. 5 are deleted. After the processing of step S220 is performed, the processing of step S245 is performed. For example, a timer T0, a timer T1, and a timer T2 in the following description are functions of the control unit 240c. A timer independent from the control unit 240c may be used.

Step S200a

The control unit 240c determines whether or not a predetermined event has occurred. The predetermined event is any one of power-supply activation of the receiver 200c, radar detection, deterioration in communication quality, and timer T0 expiration. The timer T0 expiration is the expiration of the timer T0. When the control unit 240c determines that a predetermined event has occurred, the processing of step S205a is performed. When the control unit 240c determines that a predetermined event has not occurred, the processing of step S225 is performed.

Step S205a

The channel information acquisition unit 243 acquires the first communication channel information and the second communication channel information from the first peripheral terminal and updates the communication channel information table. Details of the processing of step S205a will be described below.

Step S245

The control unit 240c sets an expiration time period T0 in the timer T0 and causes the timer T0 to start an operation. Processing interval information stored in the storage unit 260 indicates the expiration time period T0. The expiration time period T0 indicates a processing interval of the acquisition process. The expiration time period T0 is longer than a predetermined time period for which the radar detection unit of the communicator in which the monitoring communication channel is set continuously executes the detection process. The processing interval information stored in the storage unit 260 of each receiver indicates the same expiration time period T0. The expiration time period T0 indicated by the processing interval information stored in the storage unit 260 of each receiver may be different as long as a period during which the acquisition process is performed simultaneously between receivers occurs. After the timer T0 starts the operation, the channel use confirmation unit 241 causes the radar detection unit to start the detection process on the monitoring communication channel.

Regarding points other than the above, the process shown in FIG. 20 is similar to that shown in FIG. 5.

Figure 21:
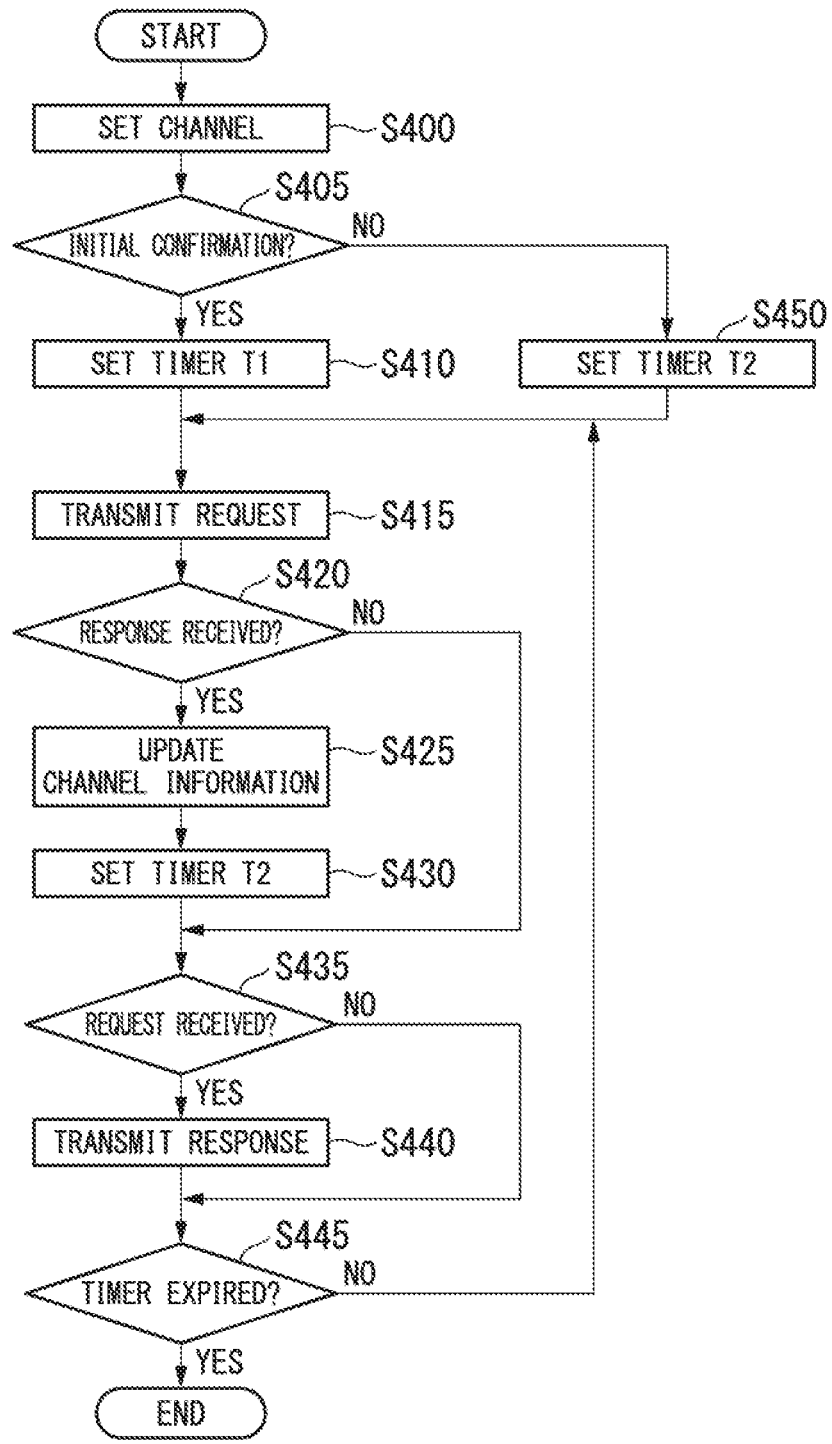
FIG. 21 is a flowchart showing a procedure of an operation of the receiver according to the fifth embodiment of the present invention.

FIG. 21 shows an operation of the receiver 200c in step S205a. The processing of step S205a includes the processing of steps S400 to S450 shown in FIG. 21.

Step S400

While the radar detection unit 233 or the radar detection unit 234 is executing the detection process, the control unit 240c causes the radar detection unit 233 or the radar detection unit 234 to stop the detection process. The channel setting unit 246 sets a channel for information communication in a communicator for monitoring. Thereby, the communicator for monitoring becomes a communicator for information communication. The channel for information communication is a communication channel which is never used by the radar. When the event detected in step S200 is power-supply activation of the receiver 200c, the channel for information communication is set in any one of the plurality of communicators.

Step S405

The control unit 240c determines whether or not initial confirmation is necessary. For example, when the event detected in step S200 is power-supply activation of the receiver 200c, the control unit 240c determines that initial confirmation is necessary. When the event detected in step S200 is an event other than the power-supply activation of the receiver 200c, the control unit 240c determines that initial confirmation is not required. When the control unit 240c determines that initial confirmation is necessary, the processing of step S410 is performed. When the control unit 240c determines that initial confirmation is not required, the processing of step S450 is performed. At a user-specified timing, the control unit 240c may determine that initial confirmation is necessary. Alternatively, after the communicator 231 or the communicator 232 performs communication for the acquisition process with another receiver, the control unit 240c may determine that initial confirmation is necessary when the communicator 231 or the communicator 232 cannot perform the communication for the acquisition process with the other receiver.

Step S410

The control unit 240c sets an expiration time period T1 in the timer T1 and causes the timer T1 to start an operation. The first processing period information stored in the storage unit 260 indicates the expiration time period T1. The expiration time period T1 indicates a first processing period during which the channel information acquisition unit 243 continuously executes an acquisition process of acquiring the first communication channel information and the second communication channel information.

Step S415

After the timer T1 starts an operation, the channel information acquisition unit 243 transmits a communication channel notification request to the first peripheral terminal using the communicator for information communication. For example, the channel information acquisition unit 243 may transmit a beacon signal using the communicator for information communication. The beacon signal includes information indicating the communication channel notification request.

Step S420

When a response to the communication channel notification request has been transmitted by the first peripheral terminal, the channel information acquisition unit 243 receives a response from the first peripheral terminal using the communicator for information communication. After the communication channel notification request is transmitted, the channel information acquisition unit 243 monitors the communicator for information communication and determines whether or not the response has been received. When the channel information acquisition unit 243 determines that the response has been received, the processing of step S425 is performed. When the channel information acquisition unit 243 determines that the response has not been received, the processing of step S435 is performed.

Step S425

The channel information acquisition unit 243 updates the communication channel information table stored in the storage unit 260 on the basis of the first communication channel information and the second communication channel information included in the received response.

Step S430

After the communication channel information table is updated, the control unit 240c sets an expiration time period T2 in the timer T2 and causes the timer T2 to start an operation. The second processing period information stored in the storage unit 260 indicates the expiration time period T2. The expiration time period T2 indicates a second processing period during which the channel information acquisition unit 243 continuously executes an acquisition process of acquiring the first communication channel information and the second communication channel information. When the timer T2 is in operation, the processing of step S430 is not performed.

Step S435

When the communication channel notification request has been transmitted by the first peripheral terminal, the channel information notification unit 244 receives the communication channel notification request from the first peripheral terminal using a communicator for information communication. The channel information notification unit 244 monitors the communicator for information communication and determines whether or not the communication channel notification request has been received. When the channel information notification unit 244 determines that the communication channel notification request has been received, the processing of step S440 is performed. When the channel information notification unit 244 determines that the communication channel notification request has not been received, the processing of step S445 is performed.

Step S440

The channel information notification unit 244 transmits a response to the communication channel notification request to the first peripheral terminal using the communicator for information communication. The response includes third communication channel information and fourth communication channel information about the communication channel set in the receiver 200c.

Step S445

After the response is transmitted, the control unit 240c determines whether the timer T1 or the timer T2 has expired.

When the control unit 240c determines that the timer T1 or the timer T2 has expired, the processing of step S205a ends. When the control unit 240c determines that neither the timer T1 nor the timer T2 has expired, the processing of step S415 is performed.

Step S450

The control unit 240c sets the expiration time period T2 in the timer T2 and causes the timer T2 to start an operation. The processing of step S450 is similar to the processing of step S430. After the processing of step S450 is completed, the processing of step S415 is performed.

After the processing of step S205a is completed, the communicator for information communication is regarded to be a communicator for monitoring in step S210 or the like. Through the processing of step S220, the channel for information communication is changed to the monitoring communication channel.

When a predetermined event has occurred (step S200a), the first processing period (the expiration time period T1) is started (step S410). The channel information acquisition unit 243 continuously executes an acquisition process due to the occurrence of the predetermined event (steps S415, S420, and S425). The channel information acquisition unit 243 can acquire the first communication channel information and the second communication channel information from a timing at which the channel information acquisition unit 243 has starts the execution of the acquisition process due to the occurrence of the predetermined event (step S425) to a timing at which the first processing period ends. In this case, the channel information acquisition unit 243 continuously executes the acquisition process from a timing at which the channel information acquisition unit 243 has acquired the first communication channel information and the second communication channel information to a timing at which the second processing period (the expiration time period T2) ends. After the second processing period ends, the channel information acquisition unit 243 stops the execution of the acquisition process (step S445).

The channel information acquisition unit 243 stops the execution of the acquisition process from a timing at which the execution of the acquisition process has been stopped to a timing at which the processing interval (the expiration time period T0) elapses. When the processing interval has elapsed from the timing at which the execution of the acquisition processing has been stopped, the second processing period is started (step S450). The channel information acquisition unit 243 continuously executes the acquisition process during the second processing period (steps S415, S420, and S425).

In a case where the channel information acquisition unit 243 has not acquired the first communication channel information and the second communication channel information from the timing at which the channel information acquisition unit 243 has started the execution of the acquisition process due to the occurrence of the predetermined event to the timing at which the first processing period ends, the channel information acquisition unit 243 stops the execution of the acquisition process (step S445). The operation of the channel information acquisition unit 243 after the channel information acquisition unit 243 stops the execution of the acquisition process is similar to the above operation.

FIG. 22 shows an example of a communication channel information table stored in the receiver 200c. A communication channel information table T200e is stored in the storage unit 260 of the receiver 200c.

The communication channel information table T200e includes the third communication channel information and the fourth communication channel information of the receiver 200c. The third communication channel information of the receiver 200c indicates a data communication channel (52 ch) set in the communicator 231 of the receiver 200c. The fourth communication channel information of the receiver 200c indicates a monitoring communication channel (124 ch) set in the communicator 232 of the receiver 200c. Further, the communication channel information table T200e includes first communication channel information and second communication channel information of each of the receivers 201c and 202c. The first communication channel information of the receiver 201c indicates a data communication channel (104 ch) set in the communicator 232 of the receiver 201c. The second communication channel information of the receiver 201c indicates a monitoring communication channel (56 ch) set in the communicator 231 of the receiver 201c. The first communication channel information of the receiver 202c indicates a data communication channel (108 ch) set in the communicator 232 of the receiver 202c. The second communication channel information of the receiver 202c indicates a monitoring communication channel (60 ch) set in the communicator 231 of the receiver 202c.

Further, the communication channel information table T200e includes information of a channel for information communication (36 ch). The information of the channel for information communication (36 ch) is the same in the communication channel information tables of receivers. In step S400, the channel setting unit 246 sets the channel for information communication in a communicator for monitoring on the basis of the information.

Figure 23:
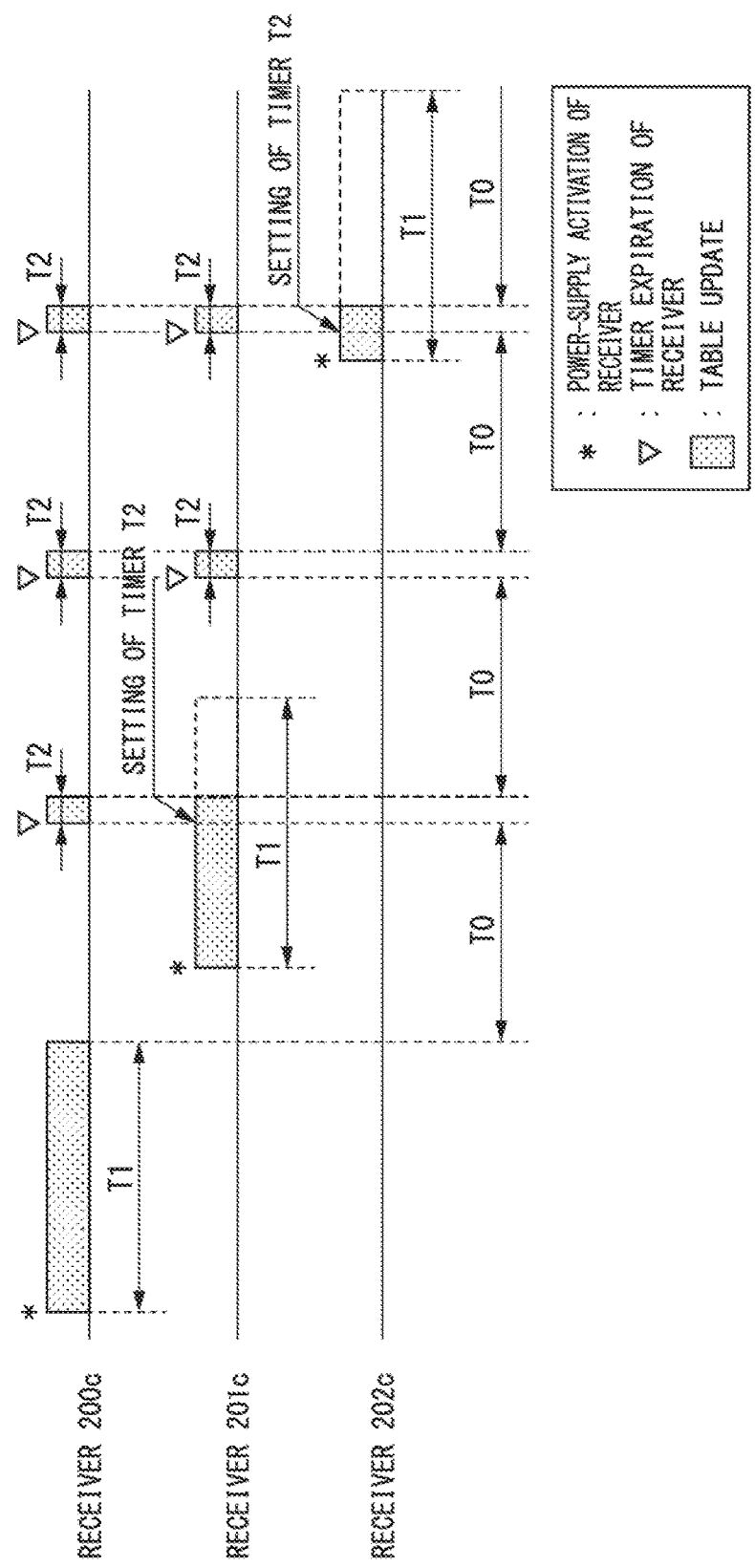
FIG. 23 is a timing chart showing an operation timing of each receiver according to the fifth embodiment of the present invention.

FIG. 23 shows a timing of the operation of each receiver. When a power supply of the receiver 200c is activated, the timer T1 of the receiver 200c starts an operation (step S410). During a period in which the timer T1 operates, i.e., the first processing period, the channel information acquisition unit 243 continuously executes the acquisition process and the channel information notification unit 244 continuously executes the notification process. When the power supply of the receiver 200c is activated, power supplies of the receiver 201c and the receiver 202c are turned off. Because the power supplies of the receiver 201c and the receiver 202c are turned off, no response is received after the communication channel notification request is transmitted from the receiver 200c through the processing of step S415. The timer T1 of the receiver 200c expires in a state in which no response is received. Thereafter, the timer T0 of the receiver 200c starts an operation (step S245). During the period in which the timer T0 of the receiver 200c operates, i.e., during a period of a processing interval of the acquisition process, the detection process of detecting the monitoring communication channel of the receiver 200c is started.

After the timer T1 of the receiver 200c expires, the power supply of the receiver 201c is activated. At this time, the timer T1 of the receiver 201c starts an operation (step S410).

When the expiration time period T0 has elapsed from a timing at which the timer T0 of the receiver 200c has started an operation, the timer T0 of the receiver 200c expires. At this time, the timer T2 of the receiver 200c starts an operation (step S450). Before the timer T1 of the receiver 201c expires, the timer T2 of the receiver 200c starts an operation.

A channel notification request is transmitted from the receiver 201c to the receiver 200c (step S415) and the response is transmitted from the receiver 200c to the receiver 201c (step S440). The response is received in the receiver 201*c* and therefore the communication channel table of the receiver 201*c* is updated (step S425) and the timer T2 of the receiver 201*c* starts an operation (step S430). Immediately after the timer T2 of the receiver 200*c* starts an operation, the timer T2 of the receiver 201*c* starts an operation. That is, the receiver 200*c* and the receiver 201*c* are synchronized by the timer T2. The receiver 200*c* and the receiver 201*c* transmit the channel notification request and a response thereto (steps S415 and S440). As a result, a communication channel table is updated in the receiver 200*c* and the receiver 201*c* (step S425). During a period in which the timer T2 operates, i.e., a second processing period, the channel information acquisition unit 243 continuously executes the acquisition process and the channel information notification unit 244 continuously executes the notification process.

When the expiration time period T2 has elapsed from a timing at which the timer T2 of the receiver 200*c* has started an operation, the timer T2 of the receiver 200*c* expires. Immediately thereafter, the timer T2 of the receiver 201*c* expires. Thus, the timers T0 of the receiver 200*c* and the receiver 201*c* start operations (step S245). After the timers T0 of the receiver 200*c* and the receiver 201*c* expire, the timers T2 of the receiver 200*c* and the receiver 201*c* start operations (step S450). The receiver 200*c* and the receiver 201*c* alternately iterate the operation of the timer T0 and the operation of the timer T2.

A power supply of the receiver 202*c* is activated. An operation similar to an operation after power-supply activation of the receiver 201*c* is performed.

In the second to fourth embodiments, communication of the information about the communication channel may be performed as in the communication in the fifth embodiment.

In the fifth embodiment, the first communication channel information and the second communication channel information are obtained through synchronous communication using a predetermined communication channel. Thus, as compared with when the acquisition process of acquiring the first communication channel information and the second communication channel information is performed on all communication channels which are capable of being used in the receiver 200 as in the first embodiment, a processing time period is shortened.

Modified Example of Fifth Embodiment

Figure 24:
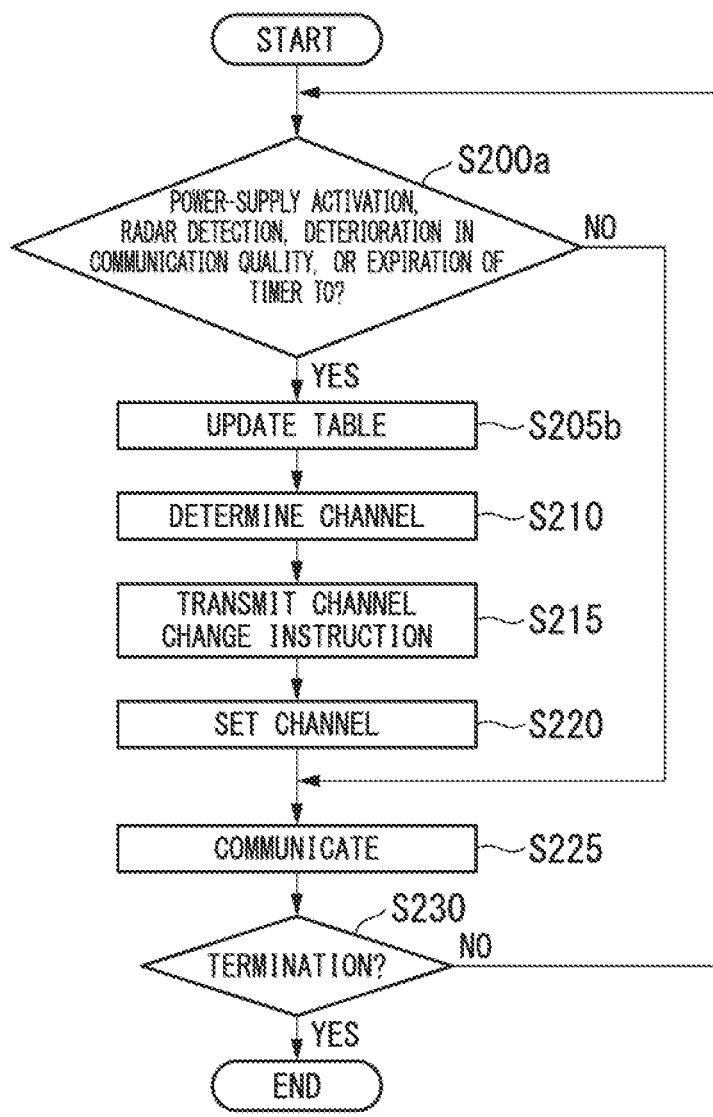
FIG. 24 is a flowchart showing a procedure of an operation of a receiver according to a modified example of the fifth embodiment of the present invention.

In a modified example of the fifth embodiment of the present invention, the process shown in FIG. 20 is changed to that shown in FIG. 24. Differences from the process shown in FIG. 20 will be described in terms of the process shown in FIG. 24.

Step S245 shown in FIG. 20 is deleted. Step S205*a* shown in FIG. 20 is changed to step S205*b*. After the processing of step S220 is performed, the processing of step S225 is performed. Regarding points other than the above, the process shown in FIG. 24 is similar to that shown in FIG. 20.

Figure 25:
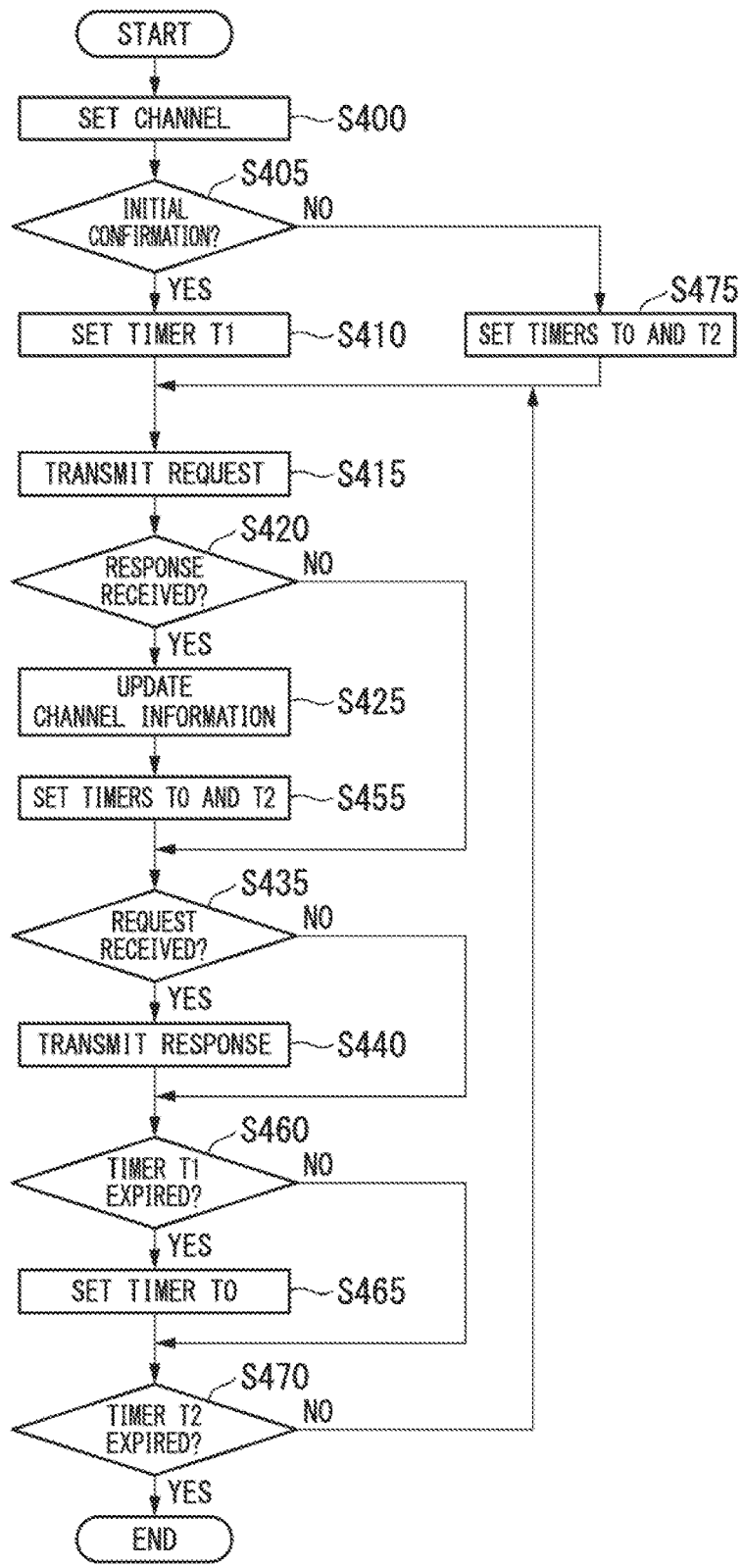
FIG. 25 is a flowchart showing a procedure of an operation of the receiver according to the modified example of the fifth embodiment of the present invention.

FIG. 25 shows an operation of the receiver 200*c* in step S205*b*. The process shown in FIG. 21 is changed to a process shown in FIG. 25. Differences from the process shown in FIG. 21 will be described in terms of the process shown in FIG. 25.

Step S450 shown in FIG. 21 is changed to step S475. Step S430 shown in FIG. 21 is changed to step S455. Step S445 shown in FIG. 21 is changed from steps S460 to S470. When the control unit 240*c* determines that initial confirmation is not required in step S405, the processing of step S475 is performed. After the processing of step S425 is performed, the processing of step S455 is performed. When the channel information notification unit 244 determines that a communication channel notification request has not been received in step S435, the processing of step S460 is performed.

Step S455

After the communication channel information table is updated through the processing of step S425, the control unit 240*c* sets the expiration time period T0 in the timer T0 and causes the timer T0 to start an operation. Further, the control unit 240*c* sets the expiration time period T2 in the timer T2 and causes the timer T2 to start an operation. After the timer T0 starts an operation, the channel use confirmation unit 241 causes a radar detection unit to start the detection process on the monitoring communication channel. When the timer T2 is in operation, the processing of step S455 is not performed. A difference between the expiration time period T0 and the expiration time period T2 is longer than a predetermined time period for which the radar detection unit of the communicator in which the monitoring communication channel is set continuously executes the detection process.

Step S460

The control unit 240*c* determines whether or not the timer T1 has expired. When the control unit 240*c* determines that the timer T1 has expired, the processing of step S465 is performed. When the control unit 240*c* determines that the timer T1 has not expired, the processing of step S470 is performed.

Step S465

The control unit 240*c* sets the expiration time period T0 in the timer T0 and causes the timer T0 to start an operation. After the timer T0 starts the operation, the channel use confirmation unit 241 causes the radar detection unit to start the detection process on the monitoring communication channel.

Step S470

The control unit 240*c* determines whether or not the timer T2 has expired. When the control unit 240*c* determines that the timer T2 has expired, the processing of step S205*b* ends. When the control unit 240*c* determines that the timer T2 has not expired, the processing of step S415 is performed.

Step S475

The control unit 240*c* sets the expiration time period T0 in the timer T0 and causes the timer T0 to start an operation. Further, the control unit 240*c* sets the expiration time period T2 in the timer T2 and causes the timer T2 to start an operation. After the timer T0 starts an operation, the channel use confirmation unit 241 causes the radar detection unit to start the detection process on the monitoring communication channel. The processing of step S475 is similar to the processing of step S455. After the processing of step S475 is performed, the processing of step S415 is performed.

Regarding points other than the above, the process shown in FIG. 25 is similar to that shown in FIG. 21.

Figure 26:
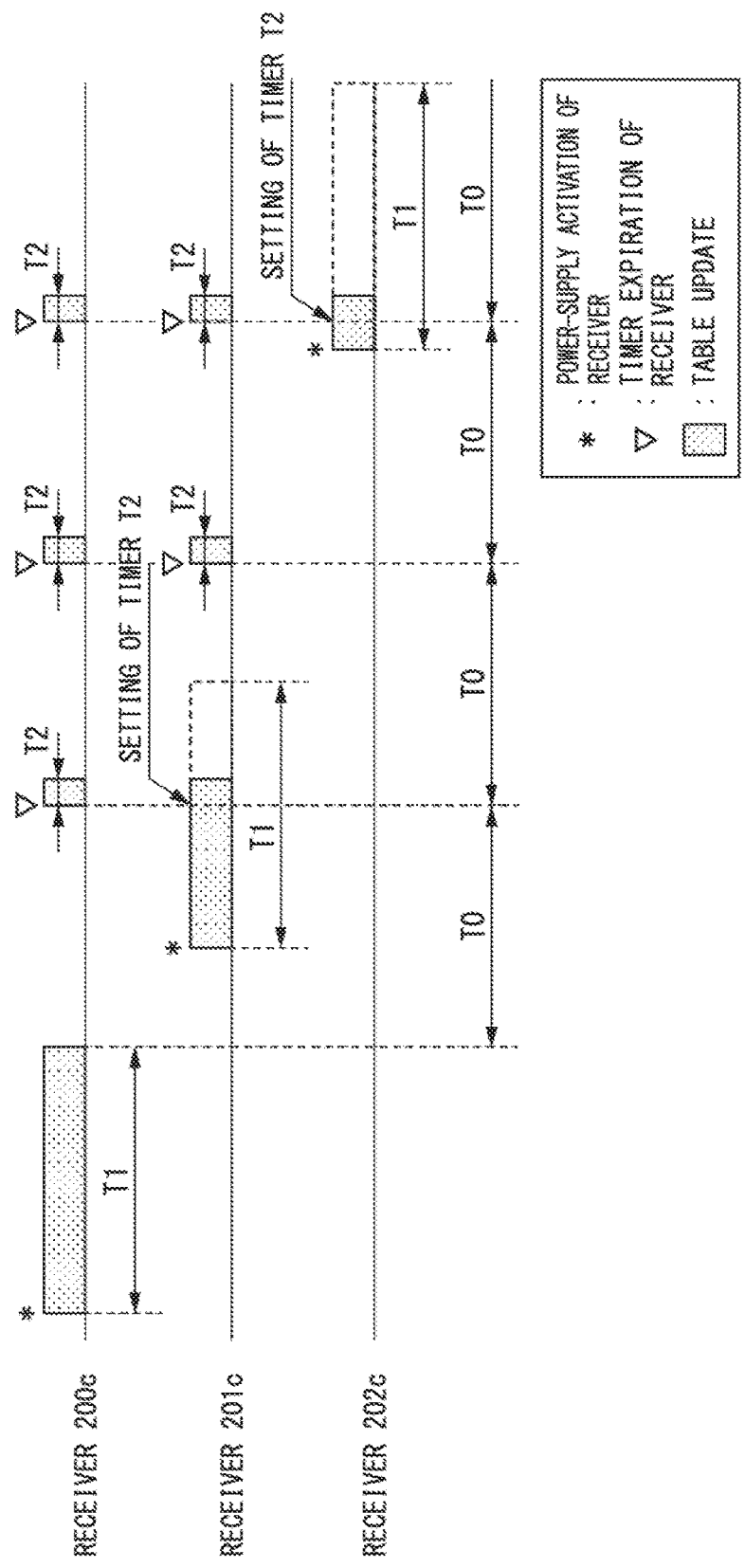
FIG. 26 is a timing chart showing an operation timing of each receiver according to the modified example of the fifth embodiment of the present invention.

FIG. 26 shows a timing of the operation of each receiver. The operation shown in FIG. 26 will be described in terms of differences from the operation shown in FIG. 23.

When the timer T1 of the receiver 200c has expired, the timer T0 of the receiver 200c starts an operation (step S465). When the timer T0 of the receiver 200c expires, the timer T0 and the timer T2 of the receiver 200c start operations (step S475). When a channel notification request has been received in the receiver 201c, the timer T0 and the timer T2 of the receiver 201c start operations (step S455). Regarding points other than the above, the operation shown in FIG. 26 is similar to that shown in FIG. 23.

In the modified example of the fifth embodiment, the first communication channel information and the second communication channel information are acquired through synchronous communication using a predetermined communication channel. Therefore, as compared with when the acquisition process of acquiring the first communication channel information and the second communication channel information is performed on all communication channels which are capable of being used in the receiver 200 as in the first embodiment, a processing time period is shortened.

While preferred embodiments of the present invention have been described and shown above, the present invention is not limited to the embodiments and modified examples thereof. Additions, omissions, substitutions, and other modifications can be made without departing from the spirit or scope of the present invention. Also, the invention is not to be considered as being limited by the foregoing description, and is only limited by the scope of the appended claims.

What is claimed is:

1. A wireless communication terminal, comprising:
a plurality of communicators configured to perform wireless communication;
a radar detection circuit configured to execute a detection process of detecting radio waves of radar on a data communication channel and a monitoring communication channel;
a channel use confirmation circuit configured to confirm whether or not the monitoring communication channel is usable for data communication by causing the radar detection circuit to continuously execute the detection process on the monitoring communication channel for a predetermined time period;
a channel information acquisition circuit configured to acquire first communication channel information and second communication channel information from a first peripheral terminal located in the periphery of the wireless communication terminal through wireless communication, the first communication channel information indicating the data communication channel set in a communicator of the first peripheral terminal, the second communication channel information indicating the monitoring communication channel set in a communicator of the first peripheral terminal or the communication channel confirmed to be usable for data communication by the channel use confirmation circuit of the first peripheral terminal;
a channel information notification circuit configured to notify the first peripheral terminal of third communication channel information and fourth communication channel information through wireless communication, the third communication channel information indicating the data communication channel set in the communicator of the wireless communication terminal, the fourth communication channel information indicating the monitoring communication channel set in the communicator of the wireless communication terminal or the communication channel confirmed to be usable for data communication by the channel use confirmation circuit of the wireless communication terminal;
a channel determination circuit configured to determine communication channels to be set in the plurality of communicators; and
a channel setting circuit configured to set the communication channels determined by the channel determination circuit in the plurality of communicators,
wherein the first peripheral terminal includes the plurality of communicators, the radar detection circuit, the channel use confirmation circuit, the channel information acquisition circuit, the channel information notification circuit, the channel determination circuit, and the channel setting circuit,
the data communication channel and the monitoring communication channel are different from each other,
communication channels set as the data communication channel and the monitoring communication channel are included in a communication channel group, the communication channel group including a plurality of communication channels, the plurality of communication channels included in the communication channel group being capable of being used by the radar, the plurality of communication channels included in the communication channel group being usable for data communication only when the radio waves of the radar have not been continuously detected for a predetermined time period,
the channel determination circuit is configured to determine a communication channel different from any of a first communication channel indicated by the first communication channel information and a second communication channel indicated by the second communication channel information as the data communication channel and the channel setting circuit is configured to set the data communication channel determined by the channel determination circuit in one of the plurality of communicators,
the channel determination circuit is configured to determine a communication channel different from any of the first communication channel and the second communication channel as the monitoring communication channel and the channel setting circuit is configured to set the monitoring communication channel determined by the channel determination circuit in a communicator which is among the plurality of communicators and is different from the communicator in which the data communication channel is set,
the channel determination circuit determines a new communication channel as the monitoring communication channel when the radar detection circuit has detected the radio waves of the radar on the data communication channel, the new communication channel being different from any of the first communication channel, the second communication channel, and the data communication channel on which the radio waves of the radar have been detected, and the channel setting circuit sets the monitoring communication channel determined by the channel determination circuit in the communicator in which the data communication channel on which the radio waves of the radar have been detected is set, and
when the radar detection circuit has detected the radio waves of the radar on the data communication channel, the communication channel confirmed to be usable for data communication by the channel use confirmation circuit becomes the data communication channel.

2. The wireless communication terminal according to claim 1, further comprising:
a scanning circuit configured to execute scanning on a communication channel which is capable of being used for data communication by the first peripheral terminal by using any one of the plurality of communicators,
wherein the first peripheral terminal further includes the scanning circuit.

3. The wireless communication terminal according to claim 1, wherein the second communication channel information indicates the monitoring communication channel set in the communicator of the first peripheral terminal and the communication channel confirmed to be usable for data communication by the channel use confirmation circuit of the first peripheral terminal.

4. The wireless communication terminal according to claim 1, further comprising:
a memory configured to store first processing period information, second processing period information, and processing interval information, the first processing period information indicating a first processing period during which the channel information acquisition circuit continuously executes an acquisition process of acquiring the first communication channel information and the second communication channel information, the second processing period information indicating a second processing period during which the channel information acquisition circuit continuously executes the acquisition process, the processing interval information indicating a processing interval, the first processing period being the same as the processing interval or longer than the processing interval, and the second processing period being the same as the first processing period or shorter than the first processing period,
wherein the channel setting circuit is configured to further set a communication channel which is never used by the radar in any one of the plurality of communicators,
the channel information acquisition circuit is configured to execute the acquisition process using the communicator in which the communication channel which is never used by the radar is set,
when a predetermined event has occurred, the channel information acquisition circuit continuously executes the acquisition process,
in a case where the channel information acquisition circuit has acquired the first communication channel information and the second communication channel information from a timing at which the channel information acquisition circuit has started the execution of the acquisition process due to occurrence of the predetermined event to a timing at which the first processing period ends, the channel information acquisition circuit continuously executes the acquisition process from a timing at which the channel information acquisition circuit has acquired the first communication channel information and the second communication channel information to a timing at which the second processing period ends,
after the second processing period ends, the channel information acquisition circuit stops the execution of the acquisition process,
the channel information acquisition circuit stops the execution of the acquisition process from a timing at which the execution of the acquisition process has been stopped to a timing at which the processing interval has elapsed, and
the channel information acquisition circuit continuously executes the acquisition process during the second processing period after the processing interval elapses from the timing at which the execution of the acquisition process has been stopped.

5. The wireless communication terminal according to claim 4, wherein, in a case where the channel information acquisition circuit has not acquired the first communication channel information and the second communication channel information from the timing at which the channel information acquisition circuit has started the execution of the acquisition process due to occurrence of the predetermined event to the timing at which the first processing period ends, the channel information acquisition circuit stops the execution of the acquisition process.

6. The wireless communication terminal according to claim 1,
wherein the channel information acquisition circuit is configured to further acquire fifth communication channel information and sixth communication channel information from the first peripheral terminal through wireless communication,
the fifth communication channel information indicates the data communication channel set in a communicator of a second peripheral terminal located in the periphery of the first peripheral terminal and the sixth communication channel information indicates the monitoring communication channel set in a communicator of the second peripheral terminal or a communication channel confirmed to be usable for data communication by the channel use confirmation circuit of the second peripheral terminal,
the second peripheral terminal includes the plurality of communicators, the radar detection circuit, the channel use confirmation circuit, the channel information acquisition circuit, the channel information notification circuit, the channel determination circuit, and the channel setting circuit,
the channel information notification circuit is configured to further notify the first peripheral terminal of the first communication channel information and the second communication channel information through wireless communication,
the channel determination circuit is configured to determine a communication channel different from any of the first communication channel, the second communication channel, a third communication channel indicated by the fifth communication channel information, and a fourth communication channel indicated by the sixth communication channel information as the data communication channel,
the channel determination circuit is configured to determine a communication channel different from any of the first communication channel, the second communication channel, the third communication channel, and the fourth communication channel as the monitoring communication channel, and
the new communication channel is different from any of the first communication channel, the second communication channel, the third communication channel, the fourth communication channel, and the data communication channel on which the radio waves of the radar have been detected.

7. The wireless communication terminal according to claim 1,
wherein the channel information acquisition circuit is configured to further acquire seventh communication channel information from the first peripheral terminal through wireless communication, the seventh communication channel information indicating at least one of the data communication channel and the monitoring communication channel on which the radio waves of the radar have been detected in the first peripheral terminal, the channel information notification circuit is configured to further notify the first peripheral terminal of eighth communication channel information through wireless communication, the eighth communication channel information indicating at least one of the data communication channel and the monitoring communication channel on which the radio waves of the radar have been detected in the wireless communication terminal, the channel determination circuit is configured to determine a communication channel different from any of the first communication channel, the second communication channel, and a fifth communication channel indicated by the seventh communication channel information as the data communication channel, the channel determination circuit is configured to determine a communication channel different from any of the first communication channel, the second communication channel, and the fifth communication channel as the monitoring communication channel, and the new communication channel is different from any of the first communication channel, the second communication channel, and the fifth communication channel and different from at least one of the data communication channel and the monitoring communication channel on which the radio waves of the radar have been detected in the wireless communication terminal.

8. A wireless communication system including a wireless communication terminal and a first peripheral terminal located in the periphery of the wireless communication terminal, the wireless communication system comprising:

the wireless communication terminal which includes a plurality of communicators configured to perform wireless communication;

a radar detection circuit configured to execute a detection process of detecting radio waves of radar on a data communication channel and a monitoring communication channel;

a channel use confirmation circuit configured to confirm whether or not the monitoring communication channel is usable for data communication by causing the radar detection circuit to continuously execute the detection process on the monitoring communication channel for a predetermined time period;

a channel information acquisition circuit configured to acquire first communication channel information and second communication channel information from the first peripheral terminal through wireless communication, the first communication channel information indicating the data communication channel set in a communicator of the first peripheral terminal, the second communication channel information indicating the monitoring communication channel set in a communicator of the first peripheral terminal or the communication channel confirmed to be usable for data communication by the channel use confirmation circuit of the first peripheral terminal;

a channel information notification circuit configured to notify the first peripheral terminal of third communication channel information and fourth communication channel information through wireless communication, the third communication channel information indicating the data communication channel set in the communicator of the wireless communication terminal, the fourth communication channel information indicating the monitoring communication channel set in the communicator of the wireless communication terminal or the communication channel confirmed to be usable for data communication by the channel use confirmation circuit of the wireless communication terminal;

a channel determination circuit configured to determine communication channels to be set in the plurality of communicators; and a channel setting circuit configured to set the communication channels determined by the channel determination circuit in the plurality of communicators, wherein the first peripheral terminal includes the plurality of communicators, the radar detection circuit, the channel use confirmation circuit, the channel information acquisition circuit, the channel information notification circuit, the channel determination circuit, and the channel setting circuit, the data communication channel and the monitoring communication channel are different from each other, communication channels set as the data communication channel and the monitoring communication channel are included in a communication channel group, the communication channel group including a plurality of communication channels, the plurality of communication channels included in the communication channel group being capable of being used by the radar, the plurality of communication channels included in the communication channel group being usable for data communication only when the radio waves of the radar have not been continuously detected for a predetermined time period, the channel determination circuit is configured to determine a communication channel different from any of a first communication channel indicated by the first communication channel information and a second communication channel indicated by the second communication channel information as the data communication channel and the channel setting circuit is configured to set the data communication channel determined by the channel determination circuit in one of the plurality of communicators, the channel determination circuit is configured to determine a communication channel different from any of the first communication channel and the second communication channel as the monitoring communication channel and the channel setting circuit is configured to set the monitoring communication channel determined by the channel determination circuit in a communicator which is among the plurality of communicators and is different from the communicator in which the data communication channel is set, the channel determination circuit determines a new communication channel as the monitoring communication channel when the radar detection circuit has detected the radio waves of the radar on the data communication channel, the new communication channel being different from any of the first communication channel, the second communication channel, and the data communication channel on which the radio waves of the radar have been detected, and the channel setting circuit sets the monitoring communication channel determined by the channel determination circuit in the communicator in which the data communication channel on which the radio waves of the radar have been detected is set, and when the radar detection circuit has detected the radio waves of the radar on the data communication channel, the communication channel confirmed to be usable for data communication by the channel use confirmation circuit becomes the data communication channel.

9. A wireless communication method for use in a wireless communication terminal including a plurality of communicators configured to perform wireless communication, the wireless communication method comprising:

a radar detection step of executing a detection process of detecting radio waves of radar on a data communication channel and a monitoring communication channel by using a radar detection circuit;

a channel use confirmation step of confirming whether or not the monitoring communication channel is usable for data communication by causing the radar detection circuit to continuously execute the detection process on the monitoring communication channel in the radar detection step for a predetermined time period;

a channel information acquisition step of acquiring first communication channel information and second communication channel information from a first peripheral terminal located in the periphery of the wireless communication terminal through wireless communication, the first communication channel information indicating the data communication channel set in a communicator of the first peripheral terminal, the second communication channel information indicating the monitoring communication channel set in a communicator of the first peripheral terminal or the communication channel confirmed to be usable for data communication in the channel use confirmation step in the first peripheral terminal;

a channel information notification step of notifying the first peripheral terminal of third communication channel information and fourth communication channel information through wireless communication, the third communication channel information indicating the data communication channel set in the communicator of the wireless communication terminal, the fourth communication channel information indicating the monitoring communication channel set in the communicator of the wireless communication terminal or the communication channel confirmed to be usable for data communication in the channel use confirmation step in the wireless communication terminal;

a channel determination step of determining communication channels to be set in the plurality of communicators; and a channel setting step of setting the communication channels determined in the channel determination step in the plurality of communicators, wherein the first peripheral terminal includes the plurality of communicators, the first peripheral terminal executes the radar detection step, the channel use confirmation step, the channel information acquisition step, the channel information notification step, the channel determination step, and the channel setting step, the data communication channel and the monitoring communication channel are different from each other, communication channels set as the data communication channel and the monitoring communication channel are included in a communication channel group, the communication channel group including a plurality of communication channels, the plurality of communication channels included in the communication channel group being capable of being used by the radar, the plurality of communication channels included in the communication channel group being usable for data communication only when the radio waves of the radar have not been continuously detected for a predetermined time period, the channel determination step includes determining a communication channel different from any of a first communication channel indicated by the first communication channel information and a second communication channel indicated by the second communication channel information as the data communication channel and the channel setting step includes setting the data communication channel determined in the channel determination step in one of the plurality of communicators, the channel determination step includes determining a communication channel different from any of the first communication channel and the second communication channel as the monitoring communication channel and the channel setting step includes setting the monitoring communication channel determined in the channel determination step in a communicator which is among the plurality of communicators and is different from the communicator in which the data communication channel is set, the channel determination step includes determining a new communication channel as the monitoring communication channel when the radio waves of the radar have been detected on the data communication channel in the radar detection step, the new communication channel being different from any of the first communication channel, the second communication channel, and the data communication channel on which the radio waves of the radar have been detected, and the channel setting step includes setting the monitoring communication channel determined in the channel determination step in the communicator in which the data communication channel on which the radio waves of the radar have been detected is set, and when the radio waves of the radar have been detected on the data communication channel in the radar detection step, the communication channel confirmed to be usable for data communication in the channel use confirmation step becomes the data communication channel.

10. A non-transitory computer-readable recording medium saving a program for causing a computer of a wireless communication terminal including a plurality of communicators configured to perform wireless communication to execute:

a radar detection step of executing a detection process of detecting radio waves of radar on a data communication channel and a monitoring communication channel by using a radar detection circuit;

a channel use confirmation step of confirming whether or not the monitoring communication channel is usable for data communication by causing the detection circuit to continuously execute the detection process on the monitoring communication channel in the radar detection step for a predetermined time period;

a channel information acquisition step of acquiring first communication channel information and second communication channel information from a first peripheral terminal located in the periphery of the wireless communication terminal through wireless communication, the first communication channel information indicating the data communication channel set in a communicator of the first peripheral terminal, the second communication channel information indicating the monitoring communication channel set in a communicator of the first peripheral terminal or the communication channel confirmed to be usable for data communication in the channel use confirmation step in the first peripheral terminal;

a channel information notification step of notifying the first peripheral terminal of third communication channel information and fourth communication channel information through wireless communication, the third communication channel information indicating the data communication channel set in the communicator of the wireless communication terminal, the fourth communication channel information indicating the monitoring communication channel set in the communicator of the wireless communication terminal or the communication channel confirmed to be usable for data communication in the channel use confirmation step in the wireless communication terminal;

a channel determination step of determining communication channels to be set in the plurality of communicators; and a channel setting step of setting the communication channels determined in the channel determination step in the plurality of communicators, wherein the first peripheral terminal includes the plurality of communicators, the first peripheral terminal is configured to execute the radar detection step, the channel use confirmation step, the channel information acquisition step, the channel information notification step, the channel determination step, and the channel setting step, the data communication channel and the monitoring communication channel are different from each other, communication channels set as the data communication channel and the monitoring communication channel are included in a communication channel group, the communication channel group including a plurality of communication channels, the plurality of communication channels included in the communication channel group being capable of being used by the radar, the plurality of communication channels included in the communication channel group being usable for data communication only when the radio waves of the radar have not been continuously detected for a predetermined time period, the channel determination step includes determining a communication channel different from any of a first communication channel indicated by the first communication channel information and a second communication channel indicated by the second communication channel information as the data communication channel and the channel setting step includes setting the data communication channel determined in the channel determination step in one of the plurality of communicators, the channel determination step includes determining a communication channel different from any of the first communication channel and the second communication channel as the monitoring communication channel and the channel setting step includes setting the monitoring communication channel determined in the channel determination step in a communicator which is among the plurality of communicators and is different from the communicator in which the data communication channel is set, the channel determination step includes determining a new communication channel as the monitoring communication channel when the radio waves of the radar have been detected on the data communication channel in the radar detection step, the new communication channel being different from any of the first communication channel, the second communication channel, and the data communication channel on which the radio waves of the radar have been detected, and the channel setting step includes setting the monitoring communication channel determined in the channel determination step in the communicator in which the data communication channel on which the radio waves of the radar have been detected is set, and when the radio waves of the radar have been detected on the data communication channel in the radar detection step, the communication channel confirmed to be usable for data communication in the channel use confirmation step becomes the data communication channel.

* * * * *